United States Patent [19]
Schempf et al.

[11] Patent Number: 5,451,135
[45] Date of Patent: Sep. 19, 1995

[54] COLLAPSIBLE MOBILE VEHICLE

[75] Inventors: Hagen Schempf; William L. Whittaker, both of Pittsburgh, Pa.

[73] Assignee: Carnegie Mellon University, Pittsburgh, Pa.

[21] Appl. No.: 41,563

[22] Filed: Apr. 2, 1993

[51] Int. Cl.[6] ............................................. B25J 5/00
[52] U.S. Cl. .............................. 414/674; 901/1; 414/729; 280/42; 180/9.48; 172/821; 165/11.2
[58] Field of Search ................. 414/729, 680, 694; 180/DIG. 906, 9.48, 9.46, 184, 192; 172/811, 815, 820, 821; 280/42; 165/11.2; 901/1

[56] References Cited

U.S. PATENT DOCUMENTS

| | | | |
|---|---|---|---|
| 3,700,115 | 10/1972 | Johnson et al. | 212/38 |
| 3,712,399 | 1/1973 | Althaus | 180/9.48 |
| 3,820,616 | 6/1974 | Juergens | 180/9.48 |
| 3,894,598 | 7/1975 | Yeou | 180/9.48 |
| 3,998,286 | 12/1976 | Ponikelsky et al. | 180/9.48 |
| 4,457,388 | 7/1984 | Koehler et al. | 180/9.48 |
| 4,552,226 | 11/1985 | Platter | 172/815 |
| 4,621,562 | 11/1986 | Carr et al. | 414/729 X |
| 4,709,265 | 11/1987 | Silverman et al. | 358/108 |
| 4,757,258 | 7/1988 | Kelly, Jr. et al. | 324/220 |
| 4,817,653 | 4/1989 | Krajicek et al. | 134/168 R |
| 4,932,831 | 6/1990 | White et al. | 414/732 |
| 4,993,912 | 2/1991 | King et al. | 901/1 X |
| 5,022,812 | 6/1991 | Coughlan et al. | 414/729 |
| 5,037,486 | 8/1991 | Sloan | 134/18 |
| 5,205,174 | 4/1993 | Silverman et al. | 73/623 |
| 5,293,887 | 3/1994 | Thibodeaux | 134/24 |

FOREIGN PATENT DOCUMENTS

| | | |
|---|---|---|
| 2417822 | 10/1975 | Germany . |
| 3811795 | 10/1989 | Germany . |
| 2-284897 | 11/1990 | Japan . |
| 2214263 | 8/1989 | United Kingdom . |
| 582961 | 12/1977 | U.S.S.R. . |
| 0591349 | 2/1978 | U.S.S.R. ................. 180/9.48 |
| 84007929 | 3/1984 | WIPO . |
| 8707009 | 11/1987 | WIPO . |

OTHER PUBLICATIONS

Seven page Kobelco Super Shovel brochure.

Primary Examiner—Donald W. Underwood
Attorney, Agent, or Firm—Kirkpatrick & Lockhart

[57] ABSTRACT

A mobile vehicle having a substantially hexagonally-shaped frame member that is movable between a collapsed position to enable the vehicle to enter a vessel opening or an area having constrained access points and a more stable expanded position. Drive apparatuses are attached to the frame member for driving the vehicle on a surface. The vehicle is also equipped with a tether line that is used to supply control power to the vehicle drives and to deploy and retrieve the vehicle. Various collapsible tool members are operably attached to the vehicle for performing various tasks within an enclosed environment.

33 Claims, 15 Drawing Sheets

COLLAPSIBLE MOBILE VEHICLE

BACKGROUND OF THE INVENTION

1. Field of the Invention

The present invention relates to mobile vehicles and, more particularly, is directed to collapsible mobile robots capable of entry into a storage tank or other large area with constrained entry points and having various types of tooling operably attached thereto to preform various cleaning, inspecting, and material handling tasks therein.

2. Description of the Invention Background

Prior and current waste disposal practices have caused degradation of the environment throughout the world. In recent years, due to the alarming rate of environmental degradation particularly in the United States, a number of laws and regulations have been enacted that require industry not only to find better ways of handling and storing both hazardous and non-hazardous waste materials but also to clean and decontaminate existing storage and disposal sites.

Such laws and regulations have not been focused on one particular industrial segment but instead have been directed to a variety of industries ranging from the nuclear power industry to the chemical and petroleum industries. For example, petroleum refineries, chemical plants, petroleum and chemical stock farms typically have large cylindrical storage tanks that have diameters ranging from 20 feet to about 300 feet and heights that range from 50 to about 100 feet that contain a variety of different hazardous materials. Tanks such as those that leak hazardous materials are often the focus of the aforementioned environmental cleanup laws. Many of those laws and regulations require hazardous material contained in leaking or deteriorating below and above-ground storage tanks to be removed therefrom and transferred to proper containment devices without the further contamination of the environment.

The cleanup and extrication of such hazardous waste materials from storage tanks, however, is typically fraught with many problems. For example, depending upon the hazardous nature of the waste material contained within the tank, human entry therein is very limited and often prohibited. In addition, access to the interior of the tank is also often limited to a relatively small diameter pipe-riser or manway that extends into the tank also making human access into the interior of the tank impossible or impractical. As such, many known material handling devices cannot be used to remove the hazardous material because such devices are not sized properly nor remotely controllable.

In addition, due to the variation of material consistency often found in storage tanks, a variety of extrication apparatuses and processes must be used to completely remove the bulk of the material from the tank. For example, often times a tank contains a combination of liquid, solid, and pasty material that must be removed therefrom.

Liquid hazardous waste material can simply be pumped from the storage tank to a proper containment device by a variety of known pumping arrangements. Such pumping methods, however, cannot extract solidified material from the tank. As such, depending upon the type of solid material to be removed, solvents may be pumped into the tank to dissolve and liquify the solid material so that it may be pumped therefrom. Also, water has been used to create a pumpable slurry of solid material that has been pulverized into particles that can be removed by the pump. However, it is undesirable to introduce liquid material into tanks that are already leaking because the weight of such material may accelerate the hazardous material leakage from the tank and would also add to the volume of material to be decontaminated and disposed of and thereby increase the costs associated with such cleanup procedures.

A variety of other apparatuses and methods have been developed for extracting solid and semi-solid hazardous materials from storage tanks. For example, one method involves positioning a backhoe-like machine on the top of the tank and extending the bucket thereof into the tank through the opening therein to remove the waste material. This method of hazardous waste extraction has limited utility, however, due to the frequent inability to completely reach the material located on the tank bottom and along the interior perimeter of the tank. In addition, this extraction method cannot be used for removal of materials from a weakened or deteriorating tank due to the tank's inability to support the weight of the backhoe-like apparatus.

Another prior method for removing materials from enclosed vessels involves the use of a gantry crane mounted above the tank opening. The crane has a clamshell type waste extraction bucket suspended therefrom that is adapted to extend into the tank through the opening therein. That method, however, is typically expensive and, depending upon the location of the vessel opening, cannot be used to remove material located around the interior perimeter of the tank.

Another apparatus developed for cleaning the interior of a storage tank is disclosed in U.S. Pat. No. 4,817,653 to Krajicek et al. The mobile, remotely powered robot disclosed therein contains sprayer apparatus and is adapted to ride upon the floor of the tank. To use that apparatus, however, the tank must first be substantially emptied and a robot entryway must be provided through the side of the tank. The component parts of the robot are then passed through the entryway into the tank wherein they are reassembled and operated by personnel located within the tank. It is readily apparent that the Krajicek apparatus cannot be used to extract hazardous materials from tanks that are substantially full of hazardous materials until the material has been removed therefrom by other extraction means. That device is also ill-suited for use in tanks where, due to the nature of the material stored therein, human access is prohibited. In addition, the Krajicek apparatus could not be used to clean storage tanks that may be substantially weakened by providing therein an entryway large enough to permit the passage of the robot's components therethrough.

Other robots adapted to operate in hostile environments are also known. For example, U.S. Pat. No. 4,932,831 to White et al. and U.S. Pat. No. 5,022,812 to Coughlan et al. disclose track-propelled robots that can be operated from a remote location by means of a tether line that is attached to the robot. Those apparatuses, while somewhat compact, are not collapsible to the extent necessary to permit them to be entered into a tank through a small existing manway or pipe riser therein and re-expanded into a more stable configuration capable of moving within the tank and performing a variety of decontamination, inspection, and material handling tasks.

Collapsible track propelled vehicles, however, are known in the construction industry. For example, U.S. Pat. No. 3,820,616 to Juergens and U.S. Pat. No. 3,700,115 to Johnson et al. disclose expandable and collapsible mobile vehicle chassis. Those apparatuses utilize various types of linear actuating devices to vary the overall track width of the vehicle. Such devices, however, are ill-suited for use inside an enclosed tank where human access is prohibited mainly due to their large size even when the tracks are fully retracted. In particular, because those vehicles require power to operate their linear actuating devices to cause the chassis thereof to assume a collapsed position, they could not be collapsed to a configuration that could be retrieved through the tank opening if power was lost to the vehicle.

As such, there is a need for a collapsible mobile vehicle that can enter a storage tank or other area with constrained entry points and be operated by personnel located outside of the tank or operating area. There is another need for a mobile vehicle that can enter a storage tank through an opening therein in a collapsed configuration and, thereafter, be expanded to a more stable material handling configuration. There is yet another need for a mobile vehicle as described immediately above that can be retrieved from a tank when power has been lost to the vehicle. There is a further need for a mobile vehicle that is capable of traversing and handling waste materials having a variety of different consistencies ranging from liquids to solids. Still another need exists for a collapsible mobile robot that may be fabricated from a variety of standard parts at a relatively low cost.

SUMMARY OF THE INVENTION

In accordance with the particular preferred form of the present invention, there is provided a mobile vehicle adapted for use in an enclosed vessel having an opening therein. The mobile vehicle has a substantially hexagonal shaped frame member that is movable between a first collapsed position wherein the frame member can enter the tank through the opening therein and a second extended position. Attached to the frame member are drive mechanisms for propelling the frame. Actuators are provided for selectively moving the frame member between a collapsed position and an extended position.

It is an object of the present invention to provide a mobile vehicle that is capable of being collapsed to a first position wherein it can be deployed through an existing opening in a storage tank and automatically expanded to a second more stable configuration after it has entered the interior of the tank.

It is another object of the present invention to provide a mobile vehicle that may be deployed into a storage tank through an existing opening therein and be operated by personnel located outside of the tank.

Another object of the present invention is to provide a mobile vehicle equipped with collapsible tooling that may be automatically expanded and operated by personnel located outside of the tank.

Still another object of the present invention is to provide a mobile vehicle capable of deployment into a storage tank through an existing opening therein and performing various material handling and sampling tasks therein.

Yet another object of the present invention is to provide a mobile vehicle that is capable of traveling over and through a variety of materials having varying consistencies ranging from liquid to solid.

Another object of the present invention is to provide a mobile vehicle capable of safe remote operation in a storage tank containing flammable or explosive materials.

Accordingly, the present invention provides solutions to the aforementioned problems associated with known mobile vehicles and apparatuses for removing waste materials from an enclosed vessel. The present invention not only provides a novel design for use in connection with hazardous waste extraction from enclosed vessels, but it also provides a unique mobile vehicle frame configuration that may comprise the chassis for a variety of other mobile vehicles. These and other details, objects and advantages, however, will become apparent as the following detailed description of the present preferred embodiment thereof proceeds.

BRIEF DESCRIPTION OF THE DRAWINGS

In the accompanying drawings, there is shown a present preferred embodiment of the invention wherein like reference numerals are employed to designate like parts and wherein.

DETAILED DESCRIPTION OF THE PREFERRED EMBODIMENTS

Figure 1:
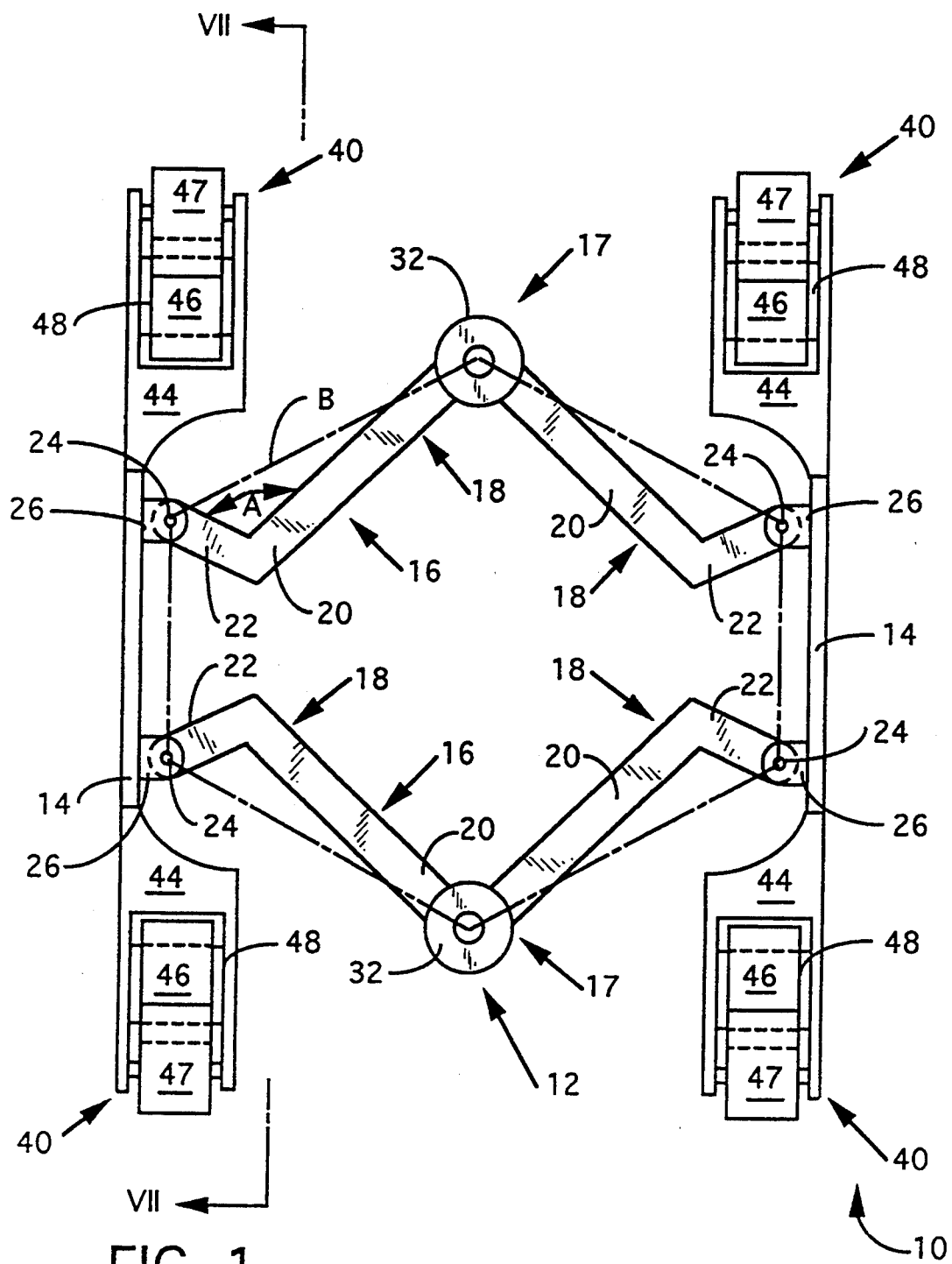
FIG. 1 is a top view of the frame member and drive arrangement of the preferred vehicle of the present invention in an expanded position with the endless driven elements removed for clarity.

Referring now to the drawings for the purposes of illustrating the present preferred embodiment of the invention only and not for purposes of limiting the same, the Figures show a mobile vehicle generally designated as 10. As will be further discussed below, the mobile vehicle 10 has many unique attributes that make it particularly suited for use in connection with extraction of hazardous waste materials from storage tanks. The mobile vehicle 10 is also well adapted for deployment into other large areas having constrained access points such as, for example, a nuclear containment building. The reader will further appreciate, however, that the novel design features of the mobile vehicle 10 may be used to accomplish a variety of other tasks without departing from the principle and scope of the present invention.

Figure 2:
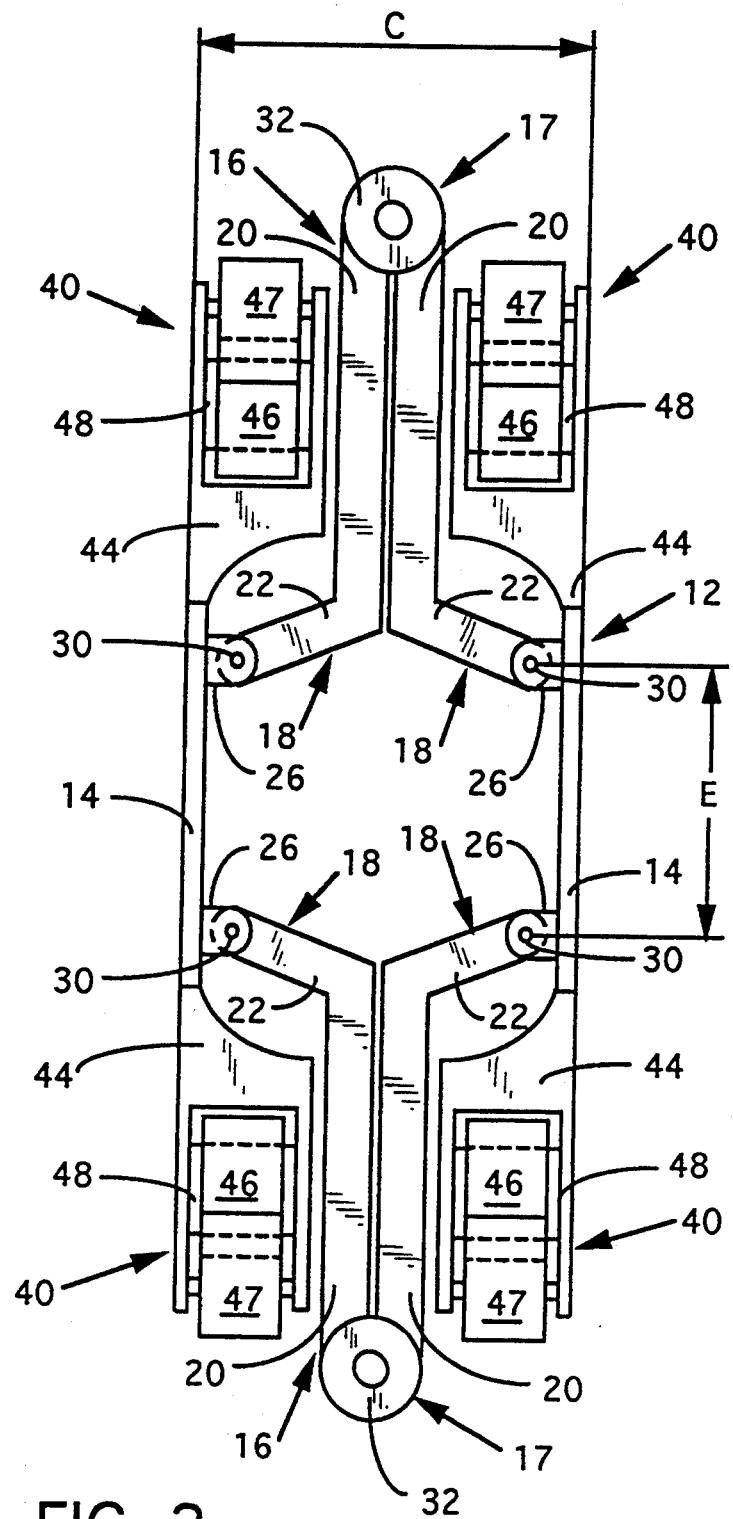
FIG. 2 is a top view of the frame member of FIG. 1 in a collapsed position.

It is the unique capability of the vehicle frame member 12 to be selectively expanded and collapsed or contracted that makes the vehicle 10 particularly well-suited for performing a variety of tasks within an enclosed environment wherein human access is prohibited. In particular, the frame member 12 can assume an expanded configuration as illustrated in FIG. 1 and a collapsed configuration as illustrated in FIG. 2. It will be appreciated from the description to follow, however, that the frame member can assume a plurality of intermediate expanded and collapsed positions. In its simplest form, the frame member 12 consists of two parallel and spaced-apart side members 14 that are pivotally interconnected by two articulated central members 16. The articulated central members 16 each have a pivotal joint 17 located in the center thereof to enable the central members 16 to be expanded and contracted.

In the preferred embodiment, the side members 14 are fabricated from metallic plate (e.g., iron, steel or aluminum) having a thickness that is capable of withstanding the various operating stresses that may be imposed thereon during operation of the vehicle. The articulated central members 16 consist of two pivotally interconnected, hollow rectangular beams 18 preferably configured as shown in FIG. 1. The beams 18 are also preferably fabricated from a metallic material (e.g., structural steel box beam) also having the structural integrity capable of withstanding various stresses that may be imposed thereon during normal operation of the vehicle 10. Those of ordinary skill in the art will also appreciate, however, that the side members 14 and the beam members 18 may be fabricated from other materials (e.g., plastic or wood) that are compatible with the operating environment and the various material handling tasks to be performed.

Figure 3:
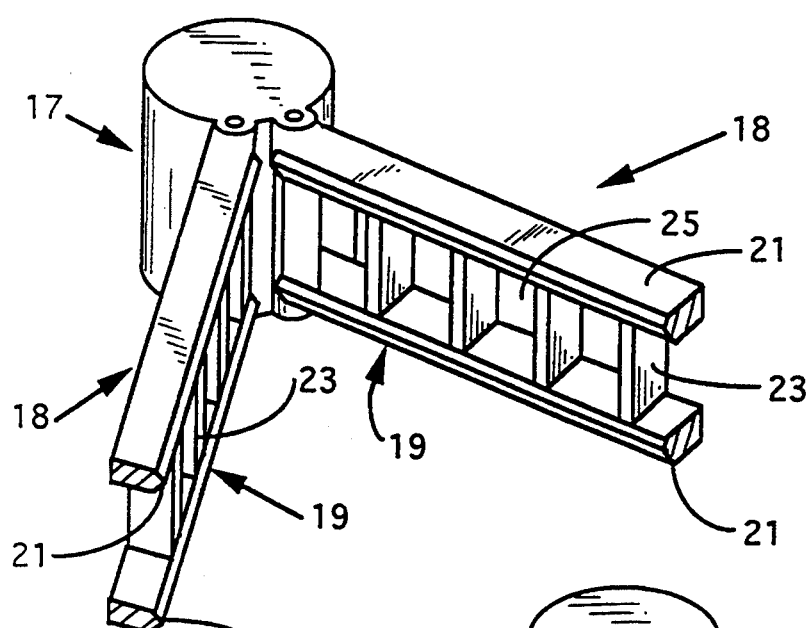
FIG. 3 is a cross-sectional perspective view of a beam member configuration of the present invention.
Figure 4:
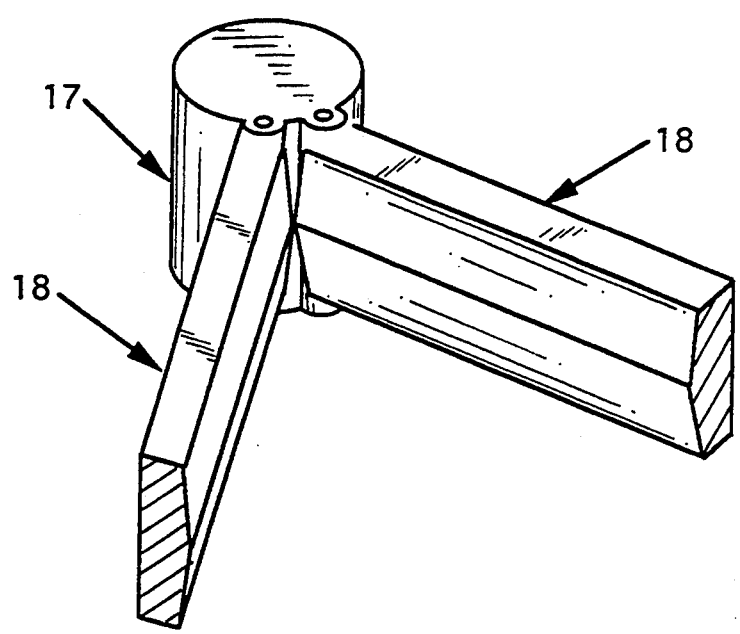
FIG. 4 is a cross-sectional perspective view of another beam member configuration of the present invention.
Figure 5:
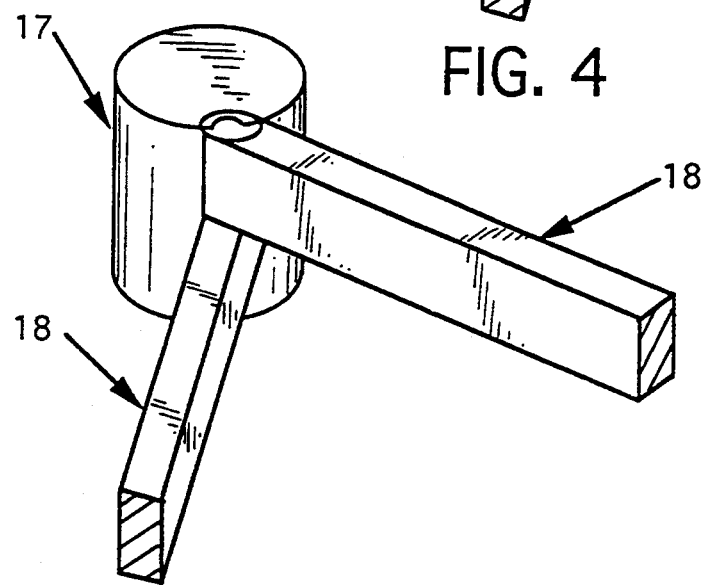
FIG. 5 is a cross-sectional perspective view of yet another beam member configuration of the present invention.
Figure 6:
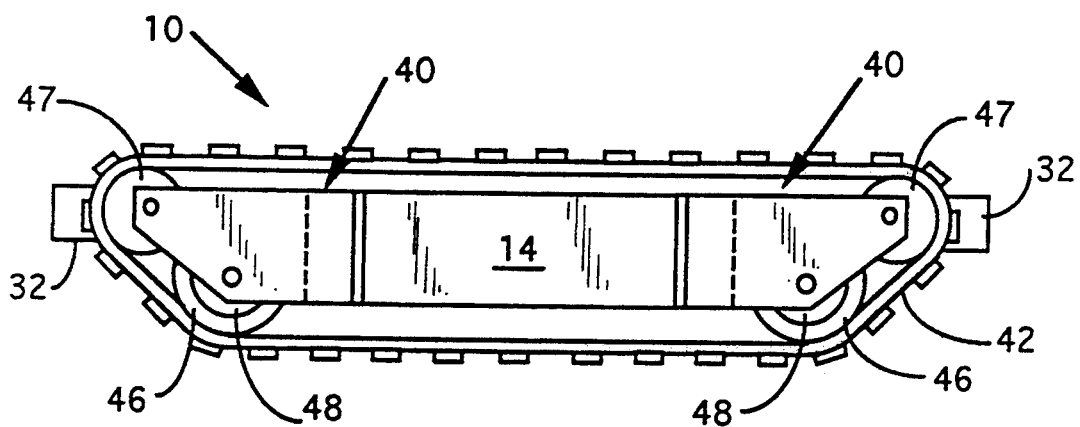
FIG. 6 is a right side elevational view of the frame member of FIG. 2.

As will be discussed in detail below, one of the unique attributes of the vehicle 10 is the ability to be collapsed even in the event of a loss of control power to the vehicle. Because the vehicle 10 possesses the ability to handle and manipulate a variety of different waste materials of varying consistencies, it is preferable for the beam members 18 to be configured so as to prevent the entrapment of waste materials between the beam members 18 that could possibly inhibit the vehicle's ability to collapse in the event of a loss of control power. FIGS. 3-5 illustrate three preferred beam 18 configurations that can be used to prevent the aforementioned entrapment of waste material between the beams 18.

As can be seen in FIG. 3, the beams 18 have an open lattice frame 19 that has tapered top and bottom portions 21 and offset vertical members 23 extending therebetween that define openings 25 therein. It will be understood that when the frame member 12 is moved to a collapsed position as shown in FIG. 2, any waste material entrained between the beams 18 will be squeezed through the openings 25 thereby preventing the material from inhibiting the articulation of the central frame members 16. Such beam 18 configuration also helps to facilitate decontamination of the vehicle 10.

In another embodiment, as shown in FIG. 4, each beam 18 has a tapered configuration for preventing the entrapment of material therebetween as the frame 12 assumes a collapsed position. Another beam configuration is illustrated in FIG. 5. In that configuration, the beams 18 are offset so that any material entrained on either beam 18 will be scraped or removed therefrom as the beams 18 are moved together. The skilled artisan will appreciate that beams 18 may be provided in a variety of other configurations adapted to prevent the entrapment of material therebetween when the frame member 12 assumes a collapsed position.

Each of the beams 18 of the central frame members 16 has an elongated portion 20 and an end portion 22 that is formed at an angle (designated as "A" in FIG. 1) with respect to the elongated portion 20. In the preferred embodiment, the angle "A" is approximately 120 degrees. However, the skilled artisan will appreciate that other angular orientations may also be successfully used.

A bore 24 is provided in each of the end portions 22 to enable the end portion 22 to be pinned to a corresponding side member 14 in a hinged fashion as shown in FIG. 1. More specifically, each of the side members 14 have two hinge members 26 attached thereto that are adapted to have one of the end portions 22 of the central members 16 pivotally pinned thereto. See FIG. 7. Preferably, the hinge members 26 each have a pin receiving bore 28 therethrough that is adapted to be coaxially aligned with the bore 24 in the corresponding end portion 22. A pin or bolt 30 is inserted through bores 24 and 28 to pivotally attach the corresponding end portion 22 to the side member 14. The pin or bolt 30 is retained in bores 24 and 28 by attaching a removable fastener (e.g., a removable nut or pin) to the end of the pin or bolt 30 that protrudes through the bore 28 in the corresponding hinge 26. The skilled artisan will appreciate, however, that the central members 16 may be pivotally attached to the side members 14 by a variety of other known fastener arrangements.

As mentioned above, a pivotal joint, generally designated as 17, is provided in the center of each of the articulated central frame members 16. Those of ordinary skill in the art will appreciate that the pivotal joint 17 may simply comprise a retaining pin (not shown) that extends through coaxially aligned bores (not shown) provided in the adjoining elongated portions 20 of the beams 18. However, for reasons that will soon become apparent, we prefer to use a rotary actuator, generally designated as 32, to form the joint 17 in at least one of the central members 16. More specifically, in the preferred embodiment, joints 17 each consist of a hydraulically operated rotary actuator 32, such as the "P-Series" rotary actuator manufactured by the Helac Corporation of Enumclaw, Wash. The preferred rotary actuators 32 each have a metal housing that facilitates attachment of the elongated portions 20 thereto by, for example, bolting or welding.

By using a rotary actuator to function as the pivotal joint 17 in each of the central members 16, the central members 16 can be expanded (see FIG. 1) and contracted (see FIG. 2) by actuating one or both of the actuators 32. It will be understood that actuators 32 can be provided with a variety of different ranges of rotary motion depending upon the amount of frame expansion ultimately desired. In the preferred embodiment, two hydraulically powered rotary actuators 32 are used (one in each central member 16). It will be understood, however, that only one actuator 32 need be actuated to cause the frame member 12 to expand and contract. It also will be understood, that to facilitate expansion and contraction of the frame member 12, only one of the joints 17 must be equipped with an actuator 32. The joint 17 of the other central member 16 could comprise a pinned joint arrangement equipped with a controllable friction or tooth brake (not shown). By using two actuators 32, one of the actuators 32 can function as a backup should the other actuator 32 fail or become disabled.

In another embodiment, both of the joints 17 comprise a simple pin/hinge arrangement with at least one of the joints being equipped with a controllable friction or tooth brake (not shown). In this embodiment, the frame 12 is caused to pivot between expanded and contracted positions by rotary actuators that are used to attach the beams 18 to the side members 14 in place of hinges 26. In yet another alternative embodiment, joints 17 can be pinned hinges as described above and rotary actuators can replace two hinges 26 on opposing corners of the frame member 12 in order to move the corresponding central frame members 16 between expanded and collapsed positions.

The skilled artisan will appreciate that the above described rotary actuators may be hydraulically, electrically or pneumatically controlled. It will be further appreciated that hydraulic, pneumatic, or electric linear actuators (not shown) may also be used to articulate the central members 16 of the frame 12.

As stated above, the above described frame member 12 of the present invention permits the vehicle 10 to be expanded position (FIG. 1) and collapsed (FIG. 2). It will be apparent to those of ordinary skill in the art that, when viewed from above, the frame member 12 is substantially hexagonal in shape. More specifically, the phrase "substantially hexagonal" as used herein refers to the interrelationship between the points of interconnection between the beam members 18 and the side members 14 and the joint 17. This hexagonal interrelationship is represented by the hexagon designated as "B" in FIG. 1. It will be appreciated that, by varying the lengths of the above described components of frame 12, the width of the frame member 12 (designated as "C" in FIG. 2), in a fully collapsed or retracted position, can be altered so that the frame member 12 can pass through an existing opening or pipe riser in an enclosed vessel such as a storage tank or enable the vehicle to pass through narrow corridors in a building such as, for example, a nuclear production facility.

By way of example, a frame member 12 constructed from the components described below could pass through a pipe or opening having an approximate inner diameter or width of 19.5 inches, when the frame member 12 is in a collapsed or contracted position. The components of such frame member 12 would have the following dimensions: the elongated portions 20 of beam members 18 would be approximately 18 inches long; the end portions 22 of the beam members 18 would be approximately 5.5 inches long; the angle "A" extending between an elongated portion 20 and an end portion 22 of a beam member 18 would be approximately 120 degrees; and the side members 14 could be approximately 12 inches long; however, the skilled artisan will appreciate that the side members 14 could be provided in other lengths (with the distance "D" between the hinge members 26 being approximately 10.5 inches—see FIG. 2). It will be understood, however, that the above-mentioned component sizes are given by way of example only and should not be construed as limiting the sizes and construction of the frame 12 components.

As mentioned above, it is an object of the present invention to provide a mobile robot that can traverse a variety of different mediums having a variety of different consistencies and viscosities. As such, the preferred embodiment of the present invention is constructed with interchangeable drive arrangements so that the drive arrangement best suited to the consistency of the medium to be traversed can easily be attached to the frame 12.

Figure 7:
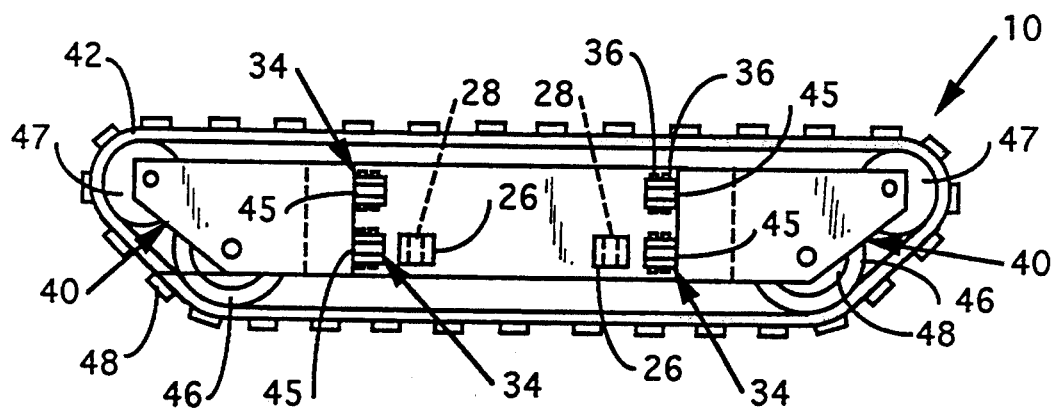
FIG. 7 is a side elevational view of the frame member of FIG. 1 taken along line VII—VII in FIG. 1 with the inner frame members removed for clarity.
Figure 14:
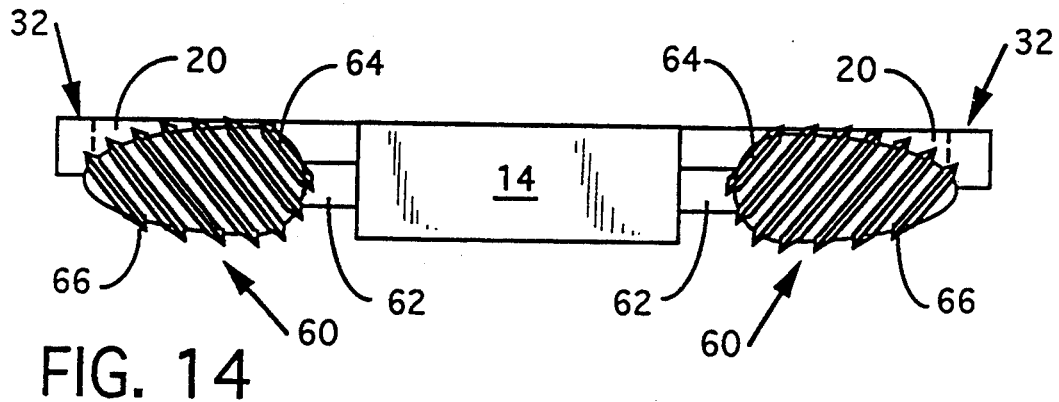
FIG. 14 is a side elevational view of the mobile vehicle of FIG. 13 in a collapsed position.
Figure 12:
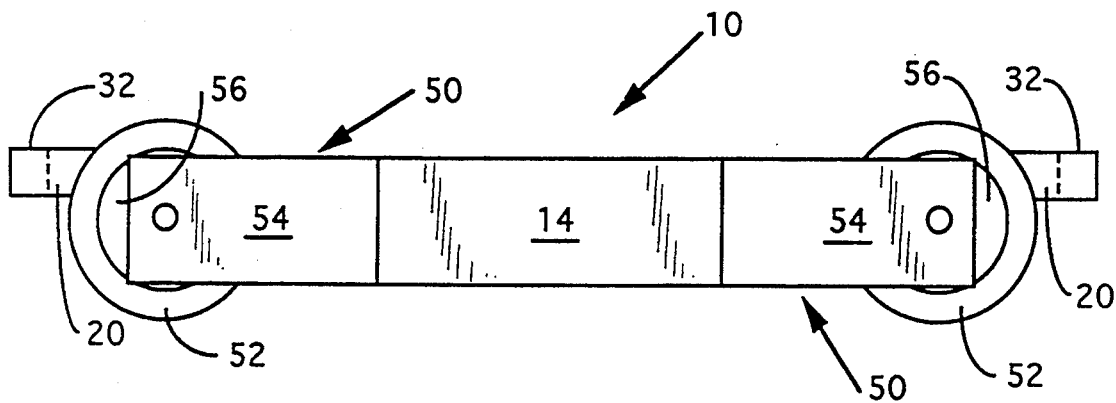
FIG. 12 is a side elevational view of the mobile vehicle of FIG. 11 in a collapsed position.
Figure 13:
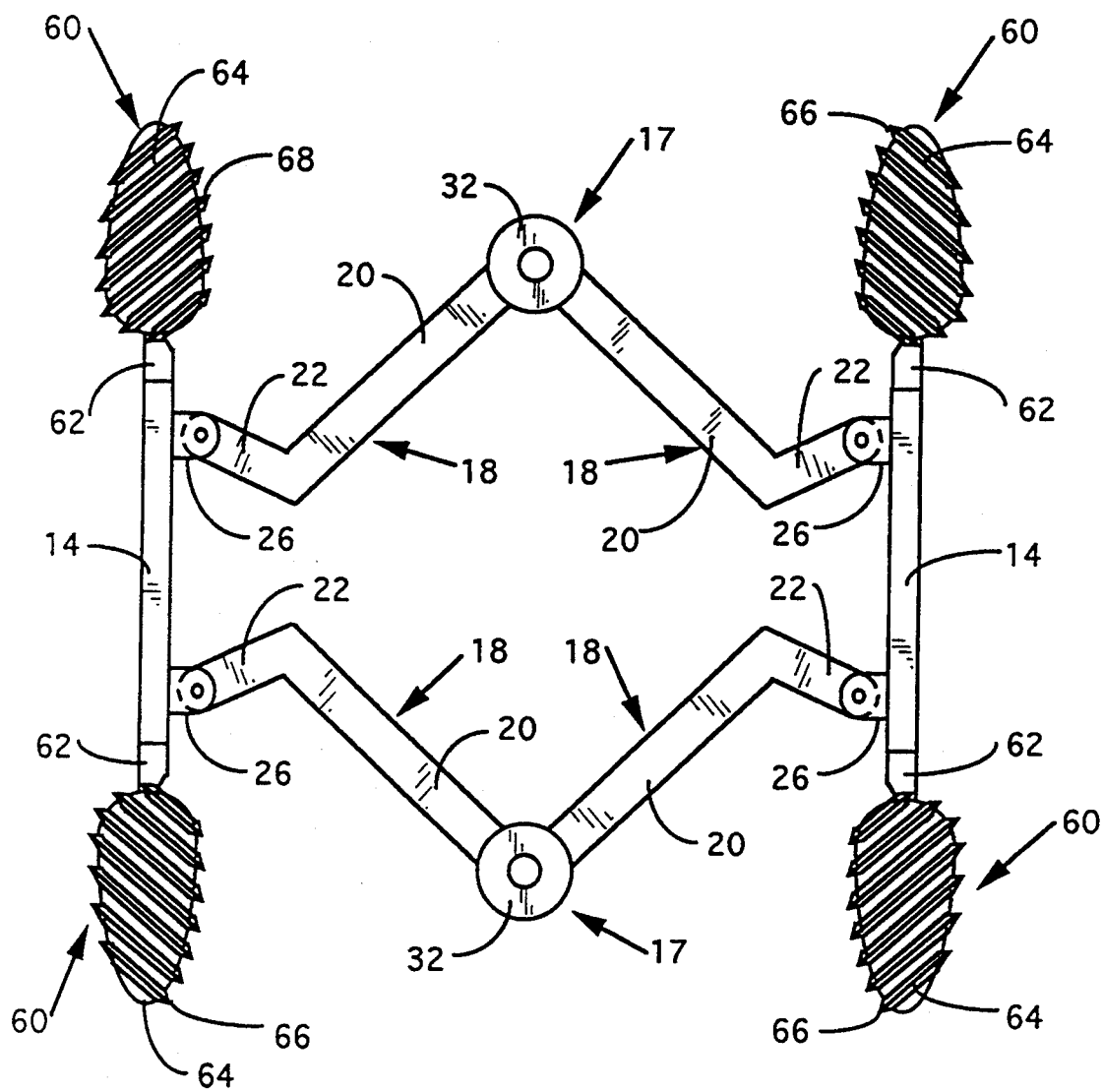
FIG. 13 is a top view of an expanded frame member and drive arrangement of another embodiment of the mobile vehicle of the present invention.

In the preferred embodiment, a drive arrangement may comprise a drive for an endless track member 40 (see FIGS. 1, 2, and 6–10), a wheel member drive 50 (see FIGS. 11 and 12) or archimedean auger drives 60 (see FIGS. 13 and 14). Regardless of the type of drive arrangement used, the method of attachment to the frame member 12 is accomplished by removably fastening the particular drive arrangement to the attachment plates 34 that are attached to the side members 14 as shown in FIG. 7.

More specifically and with reference to FIGS. 1, 2 and 6–10 there is shown four drive arrangements, generally designated as 40, for driving an endless track member 42. Each drive arrangement 40 comprises a housing or mounting block 44 that preferably has two, spaced-apart mounting plates 45 attached to the one end thereof. See FIG. 7. The mounting plates 45 are designed to be received between the corresponding attachment plates 34 on a side member 14 and be bolted or pinned thereto by removable fasteners 36. It will be appreciated, however, that housing or mounting block 44 may be removably attached to the side members 14 by a variety of other known fastening means.

Rotatably mounted to the housing 44 are sprockets 46 and 47 that are adapted to engage the endless track member 42. In the preferred embodiment, sprocket 46 is received on a hydraulically operated motor assembly 48, such as, a hydraulic travel motor assembly manufactured by KOBELCO America, Inc. of 10515 Harwin Drive, Houston, Tex. 77036. The motor assembly 48 is mounted to the housing 44 such that the sprocket 46 attached thereto extends through the housing 44 to drivingly engage the endless track member 42. In an alternative embodiment, shown in FIGS. 9 and 10, sprocket 47 is omitted.

In addition, those of ordinary skill in the art will appreciate that only one drive motor assembly 40 is needed to drive each of the endless tracks 42. The other drive assemblies 40 could be constructed without motor assemblies 48 so that the sprockets 46 and 47 serve as idler sprockets for receiving the endless track 42 thereon. For example, the drive assemblies 40 attached to the rear ends of the side members 14 can be provided with motor assemblies 48 while the drive assemblies 40 attached to the front ends of the side members 14 can contain sprockets 46 and 47 that are not driven but simply function as idler sprockets. In the preferred embodiment, however, all four drive arrangements 40 are provided with motor assemblies 48. It will be readily appreciated, however, the vehicle 10 may be operated by powering only one drive assembly 40 on each side of the vehicle. As such, in this embodiment, the vehicle 10 can be powered by two or four drive assemblies. The skilled artisan will also appreciate that the sprockets 46 can also be driven by appropriately sized electric motors that are either AC or DC powered or appropriate pneumatically controlled motors. In addition, it will be further appreciated that small track engaging sprockets, commonly known as "bogies" (not shown), may be strategically attached to the housing 44 and the side members 14 to keep the endless tracks 42 entrained on their corresponding sprockets 46 and 47 and fully supported along the length of the tracks 42 that contact the ground. It will also be understood that endless tracks 42 may be designed with a variety of different cleat configurations that are particularly adapted for travel on the specific medium upon which the vehicle 10 will be travelling.

Figure 11:
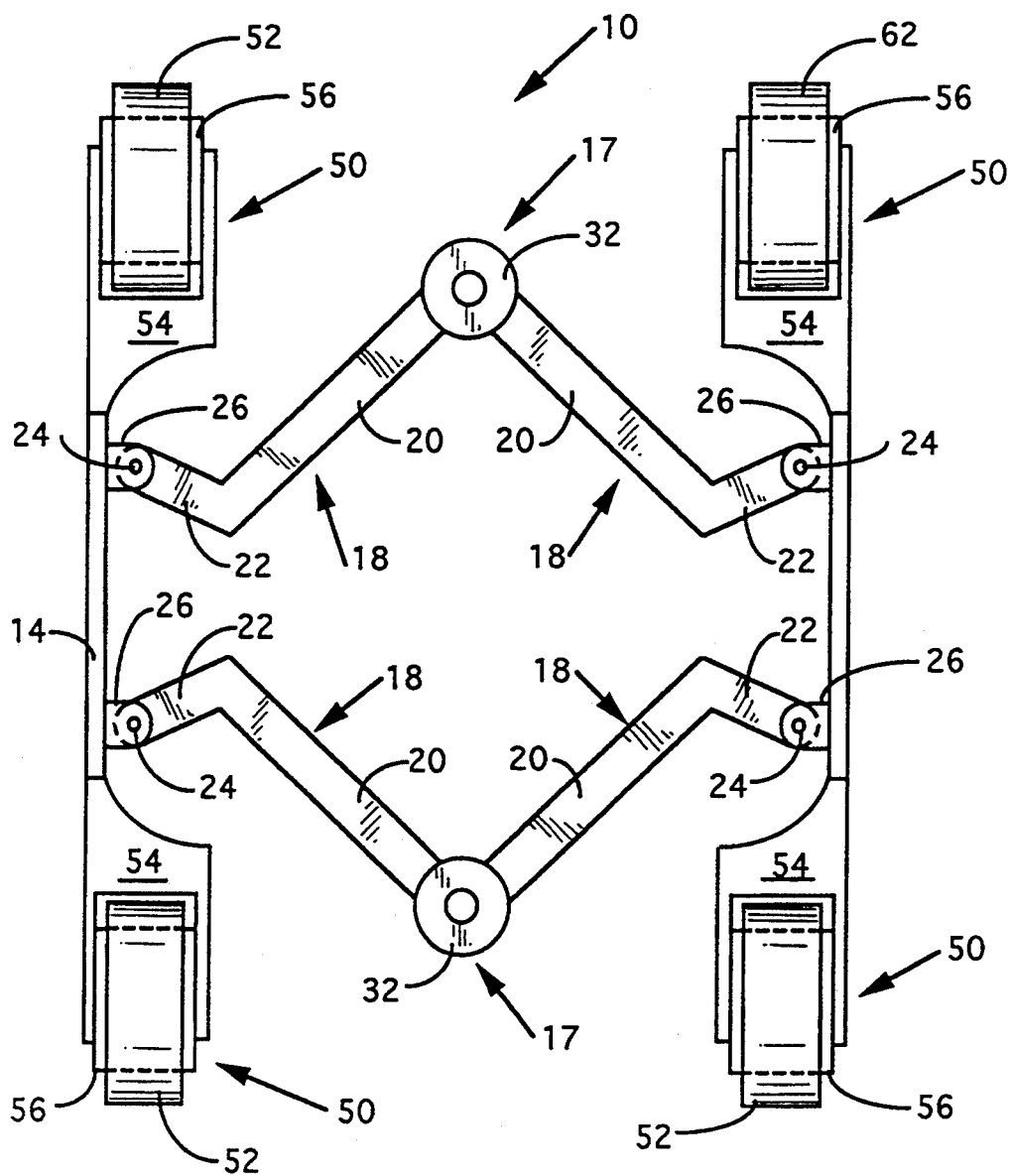
FIG. 11 is a top view of an expanded frame member and drive arrangement of another embodiment of the mobile vehicle of the present invention.

Turning now to FIGS. 11 and 12, there is shown a frame member 12 that has four drive assemblies 50 attached thereto that are each equipped with a ground engaging wheel 52. In this embodiment, a drive assembly 50 consists of a housing 54 that is configured for attachment to a corresponding side member 14 in the manner described above for attaching the track drive assemblies 40 to the frame 12. Attached to the housing 54 is a drive motor assembly 56 similar to the drive motor assemblies 48 described above. A ground engaging drive wheel 52, sized to pass through the opening in the enclosed vessel in which it is to be operated, is entrained on the motor assembly 56. It will be appreciated that only the front two or rear two drive assemblies 50 need to be powered to move the vehicle 10. As such, the front two, or rear two drive assemblies 50 can be constructed such that the wheels attached thereto are free-wheeling. In the preferred embodiment, each of the drive assemblies 50 are equipped with hydraulic motor assemblies 56 so that the vehicle 10 can be driven by two wheels or four wheels. It will be understood that the drive assemblies 56 may, in the alternative, consist of appropriately sized AC or DC motors or pneumatically driven motors.

FIGS. 13 and 14 depict yet another drive assembly arrangement for driving the vehicle 10 of the present invention. In this embodiment, archimedean screws of the type commonly employed on snow traversing vehicles, are employed to drive the vehicle. More specifically, the screw drive assemblies generally indicated as 60 each comprise a housing member 62 that is attached to one of the corresponding side members 14 in the manner as was described above. A hydraulically, pneumatically or electrically powered motor (not shown) is contained within the housing 62 and is operatively connected to a corresponding elliptical-shaped drive cylinder 64 that has helically wound surface engaging cleats 66 attached to the outside surface thereof. In the preferred embodiment, the drive cylinders 64 are hollow and thereby also function as floatation devices to enable the vehicle 10 to be propelled on the surface of a liquid medium.

The vehicle 10 of the present invention is designed for carrying and deploying various tools for accomplishing a variety of different tasks within an enclosed vessel such as a storage tank. For example, the vehicle 10 is well adapted for carrying an extendable and contractible manipulator 80 for accomplishing a variety of different material handling tasks within the enclosed vessel. See FIG. 8. In the preferred embodiment, an extendable and collapsible manipulator 80, such as the 6 DOF Schilling Titan II manipulator manufactured by Schilling Development, Inc. of 1633 DaVinci Court, Davis, Calif. 95616 is pivotally attached to the rear portion 13 of the frame member 12. More specifically, the manipulator 80 is preferably attached to a rotary actuator 82 that is mounted above the joint 17 of rear central frame member 16. It will be appreciated that the rotary actuator 82 is mounted to the rear central member 16 such that the rotary motion thereof will not interfere with or inhibit the pivotal motion of joint 17 or the rotary actuator 32 therefor. As can be seen from FIG. 8, the manipulator 80 is articulated at joints 84 and 86 and is equipped with a hydraulic cylinder 88 for extending and the lower beam portion 85 thereof e.g., by pivoting into a variety of different positions. In addition, a gripper assembly 90 is rotatably attached to the end of the end beam 87 by a rotatably actuated wrist member 91 and is adapted to grip a wide variety of different tools. Also, a video camera 92 and lights 94 are preferably attached to the beam 87 near the gripper assembly 90 to enable the vehicle's operation to be monitored by personnel located outside of the vessel.

Figure 15:
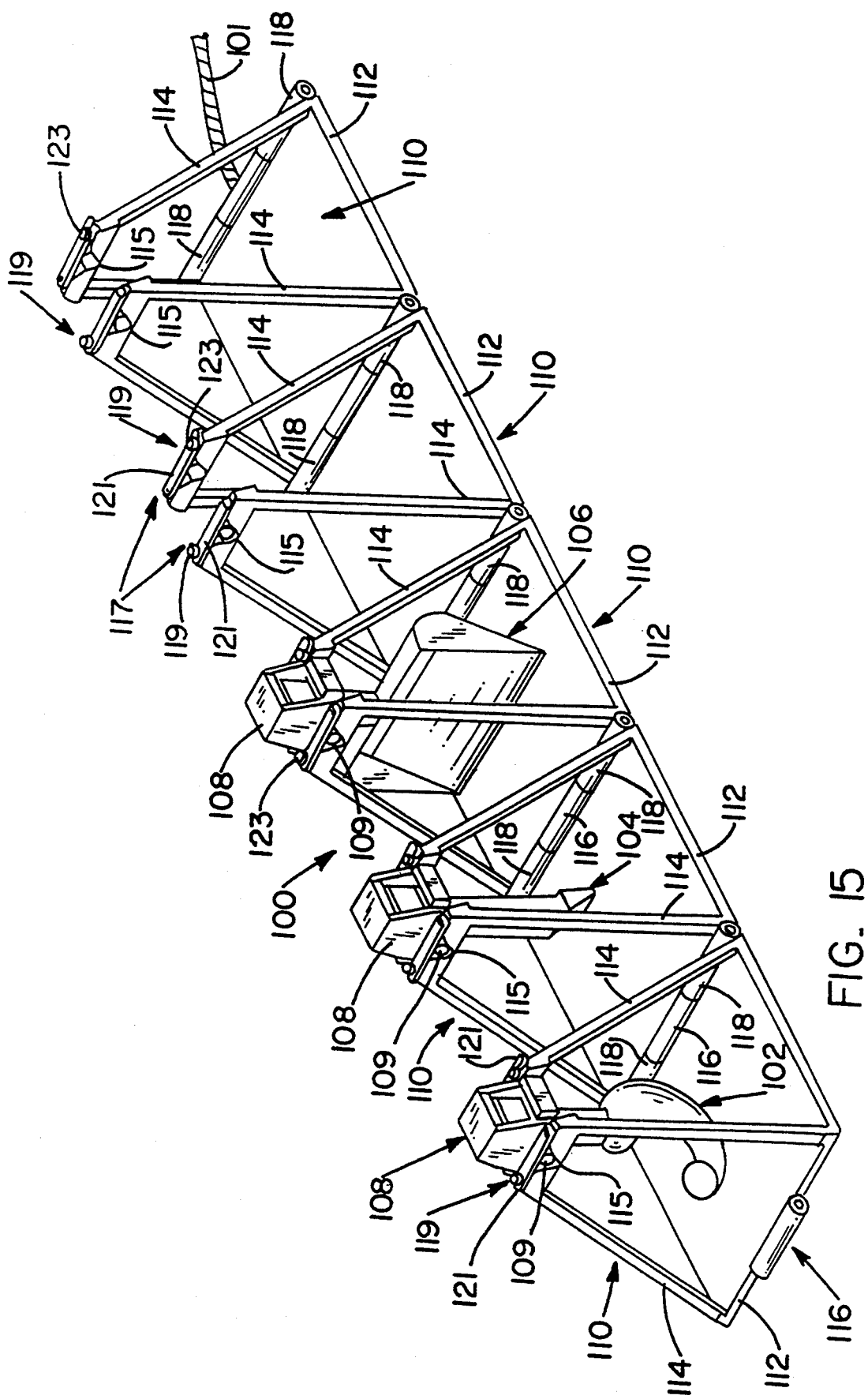
FIG. 15 is a perspective view of the preferred tool rack of the present invention.

As can be seen in FIG. 15, a variety of different tools may be deployed within the storage tank on a tool rack generally designated as 100, for use by the manipulator 80. By way of example, FIG. 15 illustrates three of the many different tools that may be provided. In particular, there is shown a hook 102, a prybar 104, and a bucket 106 that are each removably retained on the tool storage rack 100. Each of the tools are equipped with a gripper adapter 108 that enables the gripper assembly 90 to grasp and manipulate the tool member thereby.

The tool storage rack 100, in its most preferred form, consists of a plurality of pivotally interconnected tool holders 110 that are each adapted to operably retain a tool member thereon. The tool holders 110 each consist of a support frame 112 that has two upstanding tool support members 114 attached thereto. The support frames 112 are equipped with hinge members 116 and 118 as shown in FIG. 15, to enable them to be removably pinned together to facilitate the addition of more tool holders 110. Each of the upstanding tool support members 114 has two cradles 115 formed therein for receiving rod members 109 that protrude from the gripper adapters 108 located on each tool. In addition, each tool holder 110 is equipped with magnetically releasable latches 117 for retaining the rod members 109 within the corresponding cradles 115 while the tool rack 100 is being deployed within the tank.

More specifically, the magnetic latches 117 each comprise an upstanding pin member 119 that is attached to a corresponding support member 114. Each latch 117 also has a latch bar 121 that is pivotally attached to the upstanding support member 114 as shown in FIG. 15. Each latch bar 121 is equipped with a pin engaging notch (not shown) that is adapted to engage the corresponding pin 119 when the latch is in the closed position. Each pin member 119 has an enlarged head portion 123 formed thereon that is adapted to prevent the latch bar 121 from accidently being disengaged from the pin 119. In the preferred embodiment, the latch bar 121 is fabricated from a magnetized material such that a magnetic circuit is established between the latch bar 121 and the top of the support member 114 when the latch bar 121 is in the retaining position. It will be appreciated that such magnetic latch arrangement serves to prevent the tools from being accidentally disengaged from the tool rack holders 100 as the tool storage rack 100 is being deployed into and retrieved from the vessel. To release the magnetically releasable latches 117, the gripper assembly 90 is used to break the magnetic circuit by rotating the latch bars 121 away from the corresponding pins 119 thus opening up the release path for the tool on both sides of the rack. The gripper assembly 90 can then grasp the individual tool (102, 104 or 106) and perform the intended task. Upon completion, the manipulator 80 is used to place the tool back into the cradle 115 of the tool rack 110 and thereafter is used to turn the latch bars 121 to their respective latch positions.

Figure 9:
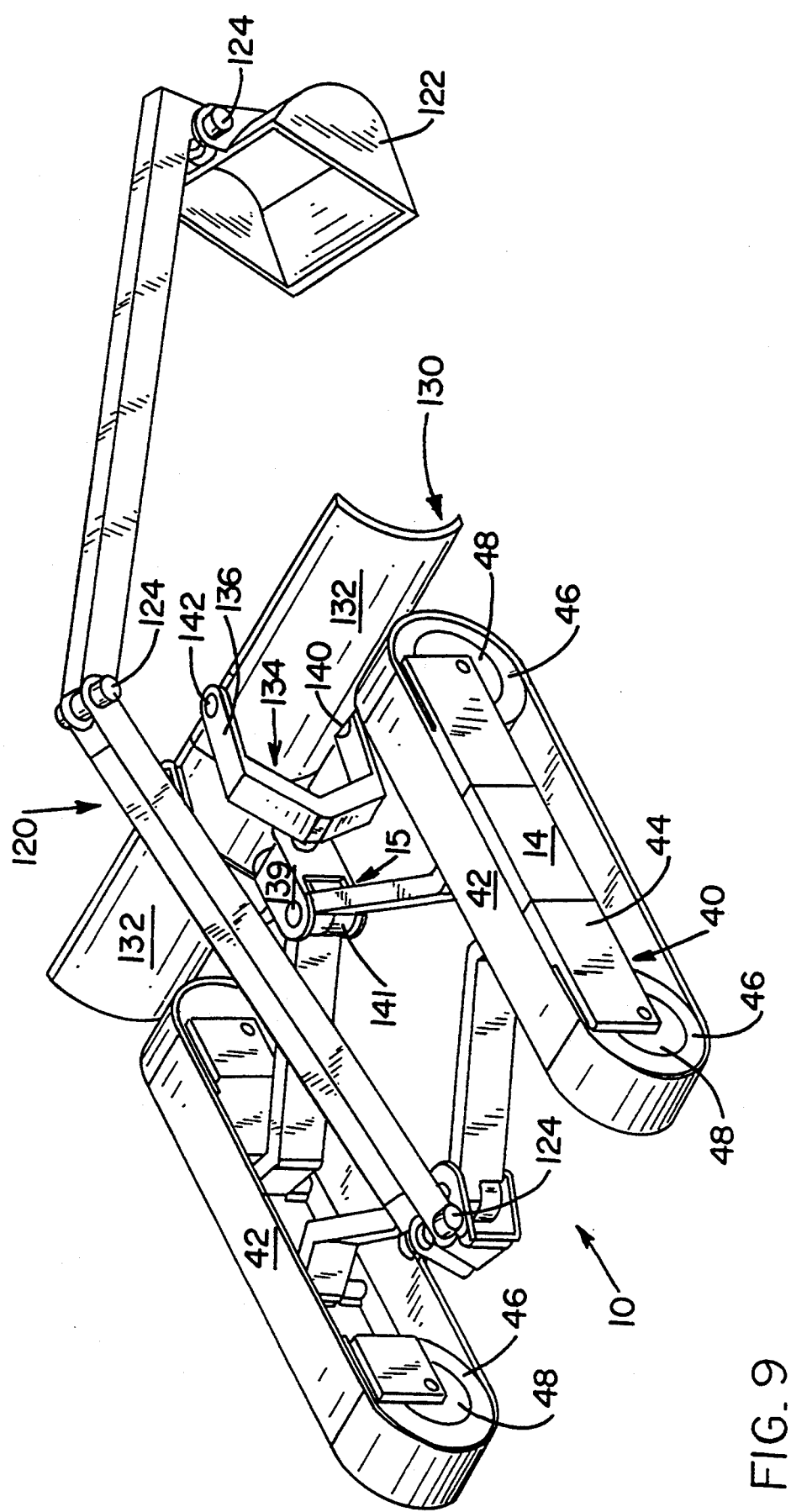
FIG. 9 is a rear perspective view of another embodiment of the mobile vehicle of the present invention.
Figure 10:
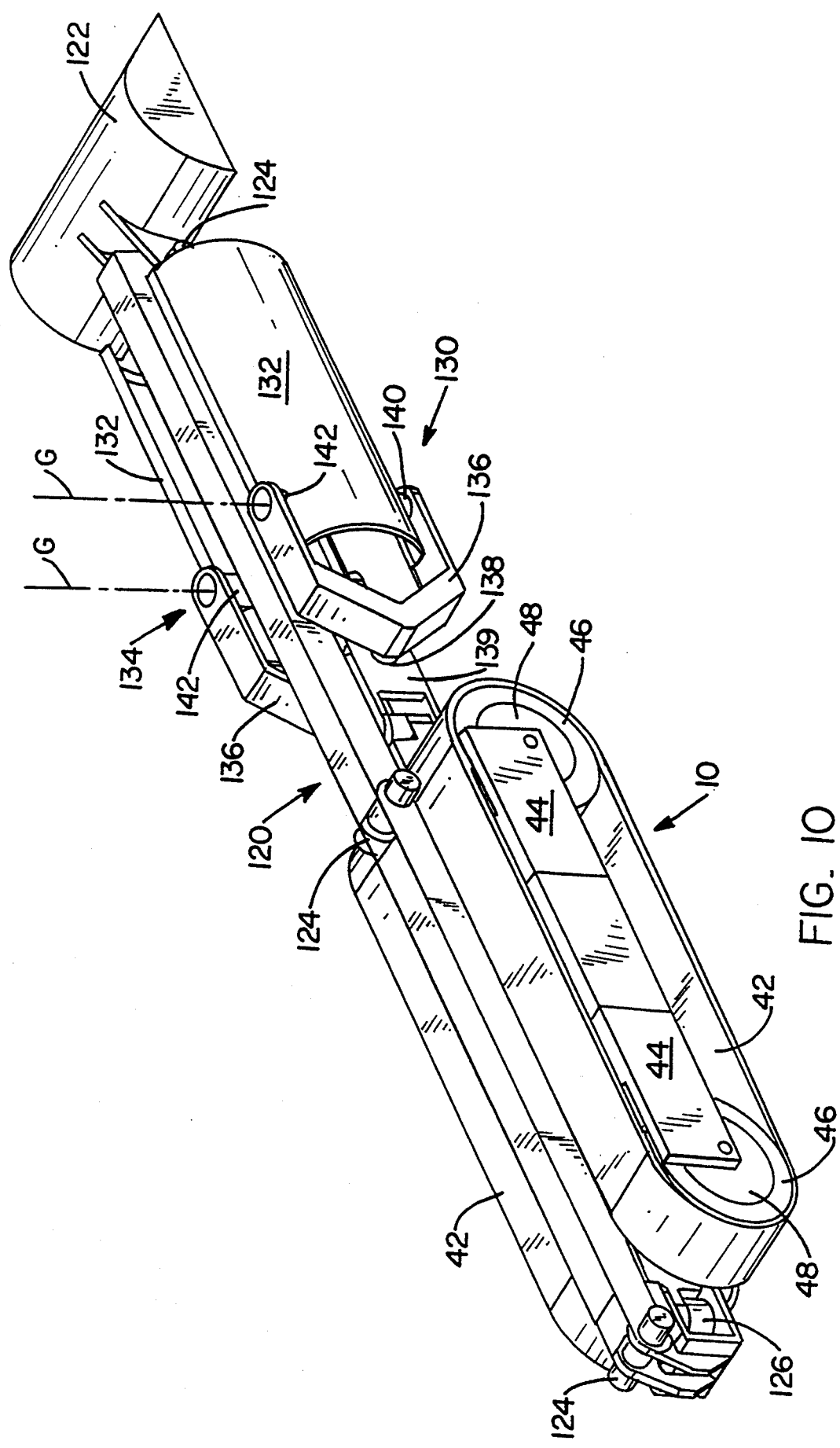
FIG. 10 is a rear perspective view showing the mobile vehicle of FIG. 9 in a collapsed position.

In another embodiment of the present invention, as shown in FIGS. 9 and 10, the manipulator 80 may be replaced with an articulated backhoe-like boom member 120 that has a material handling bucket member 122 pivotally and operatively attached thereto. In that embodiment, hydraulically operated rotary actuators 124 are used to manipulate the beam and bucket in a manner well known in the art.

Figure 8:
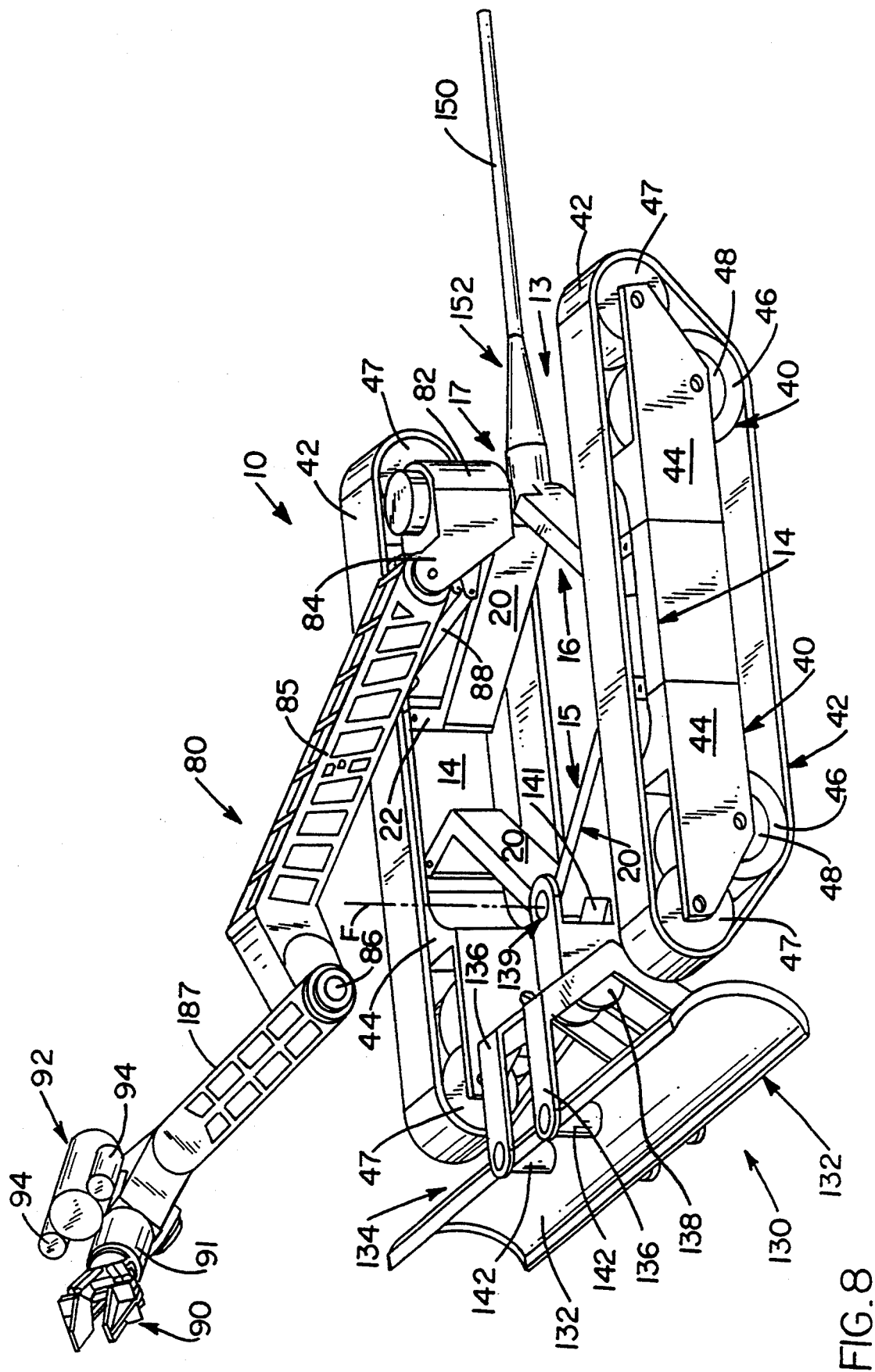
FIG. 8 is a front perspective view of the preferred mobile vehicle of the present invention.

Also in the preferred embodiment, the vehicle 10 is equipped with a collapsible plow member 130 that is operably attached to the front end 15 of the frame member 12. As can be seen in FIGS. 8-10, the collapsible plow member 139 consists of two plow blades 132 that are pivotally attached to a plow bracket 134. More specifically, the plow bracket 134 consists of two spaced-apart, generally "C"-shaped support members 136. Interconnecting the "C"-shaped support members 136 is a hydraulically or electrically operated rotary actuator 138. As can be seen in FIG. 8, actuator 138 is attached to a mounting bracket 139 that is attached to the front central frame member 16. It will be appreciated that actuator 138 permits the plow bracket 134 to be selectively raised and lowered with respect to the frame 12. In addition, a rotary actuator 141 may also be used to enable the mounting bracket 139 and ultimately the plow member 130 to pivot about axis "F" (shown in FIG. 8) to assume a plowing orientation for plowing the material to either side of the vehicle 10.

Each blade member 132 is pivotally attached to one of the support members 136 in two places. In particular, each lower side of the blade members 132 is pivotally attached, preferably by a pin member 140 to the lower portion of one of the "C"-shaped brackets as shown in FIGS. 8-10. The top portion of each blade member 132 is pivotally attached to one of the upper portions of a corresponding "C"-shaped support bracket 136 by a hydraulically or electrically powered rotary actuator 142. As such, actuation of the rotary actuators 142 will cause the blade members 132 to pivot about their respective pivot axes "G" (shown in FIG. 10) between an open position (FIGS. 8 and 9) and a collapsed position (FIG. 10). It will be understood that the plow member 130 can be moved to the collapsed position to permit the vehicle 10 to pass through the vessel opening. After the vehicle 10 has entered the vessel, the plow member 130 can be expanded to the position shown in FIGS. 8 and 9 by actuating the rotary actuators 142 to cause the blade members 132 to pivot to the open position.

The mobile vehicle 10 of the present invention may also be equipped with other apparatuses adapted to perform a variety of other tasks within an enclosed environment. For example, the vehicle 10 may be equipped with apparatuses to perform radiation monitoring; viscosity, temperature, and density measurements; gas/air sampling; water spraying operations and material coring and sampling. It will be understood, however, that in those applications wherein the vehicle is designed to enter an enclosed vessel through an opening having a fixed diameter, the aforementioned apparatuses must not inhibit the vehicle's ability to do so.

In those applications wherein the vehicle 10 of the present invention is to be deployed into an enclosed vessel, control power is preferably supplied to the vehicle 10 by means of a tether line 150 that is attached to the rear central frame member 16, preferably at joint 17 thereof by a tether attachment member, generally designated as 152. See FIG. 8. Such tether attachment members are well known in the art concerned with the deployment and operation of undersea vehicles. For example, the ball joint tow point adapter and termination and tether strain relief apparatuses manufactured by PMI Industries, Inc. of 5300 St. Claire Ave, Cleveland, Ohio are well-suited for attaching the tether line 150 to the vehicle 10.

Figure 16:
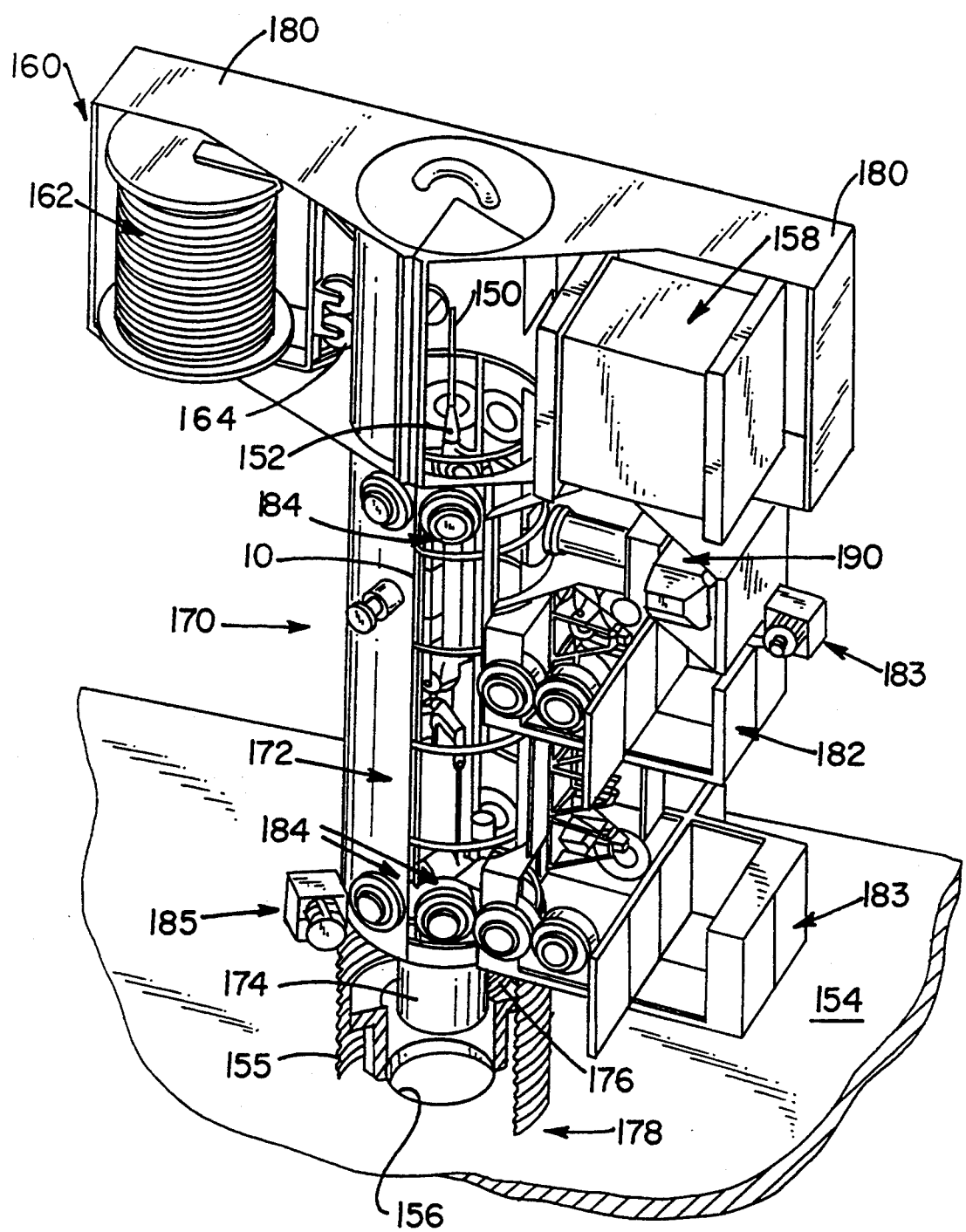
FIG. 16 is a perspective view of the preferred deployment pod of the present invention mounted on a vessel and aligned with the manway therein.

It will be understood that the vehicle 10 can also be deployed and retrieved by the tether line 150 and a tether line management system 160, such as the tether line manufactured by BIW Cable Systems, Inc. of 22 Joseph E. Warner Blvd., No. Dighton, Mass. 02764 and the tether line management system manufactured by Dynacon, Inc., 831 Industrial Blvd., Bryan, Tex. 77803. See FIG. 16. In the preferred embodiment, the tether line management system 160 consists of a powered tether spool 162 and a level-wind member 164 that enables the tether 150 to be evenly wound onto the spool 162 during the vehicle retrieval cycle. As can be seen in FIG. 16, the tether line management system 160 is preferably contained within a sealed deployment pod 170. In the preferred embodiment, the deployment pod 170 consists of a hollow cylindrical-shaped main shell 172 that is sized to receive therein the collapsed vehicle 10. Attached to the one end of the main shell 172 is a riser tube insert 174 that is adapted to extend through the opening 156 in the vessel 154 to assist with deployment and retrieval of the vehicle 10. A first bellows member 176 also preferably extends around the riser tube insert 174 and is attached to the one end of the cylindrical-shaped main shell 172 so that it can mate with the top of the upwardly extending manway 155. In the preferred embodiment, a second bellows 178 is provided to extend around the manway 155 and mate with the top of the vessel 154 to further ensure that no hazardous material is discharged into the environment.

As can be further seen in FIG. 16, the deployment pod 170 has two outwardly extending portions 180 attached thereto for housing therein the tether management system 160 and the hydraulic, pneumatic or electrical power unit 158 that supplies hydraulic or electrical power to the vehicle 10. The deployment pod 170, in its preferred form, is also equipped with a tool rack exchange air lock unit 182 for permitting additional tools and tool rack holders 110 to be added to the tool rack 100 without allowing hazardous material or fumes to escape from the deployment pod 170. In the preferred embodiment, as illustrated in FIG. 16, a second airlock 182 is provided for the controlled admission of other maintenance items into the pod 170. Also, for facilitating deployment and retrieval of the tool rack 100, a tool rack winch 183 is provided for controlling the tether line 101 that is attached to the tool rack 100. In addition, the deployment pod 170 is also preferably equipped with glove-box entries 184 to facilitate maintenance of the vehicle 10, the tool rack 100, and the other support equipment located within the deployment pod 170 by personnel located outside of the deployment pod 170. In the preferred embodiment, the deployment pod 170 is also equipped with a variety of known decontamination apparatuses generally indicated as 190, such as, for example, sprays and filtering devices for decontaminating the vehicle 10 after it has been removed from the vessel 154.

In the preferred embodiment, the vehicle 10 is controlled from a control console 200 that contains the controls for operating the various tools and actuators mounted on the vehicle 10. See FIG. 17. More specifically, the preferred method of vehicle operation comprises a known joy stick control system, such as those manufactured by RedZone Robotics, Inc. of 2425 Liberty Avenue, Pittsburgh, Pa. 15222-4639.

Figure 17:
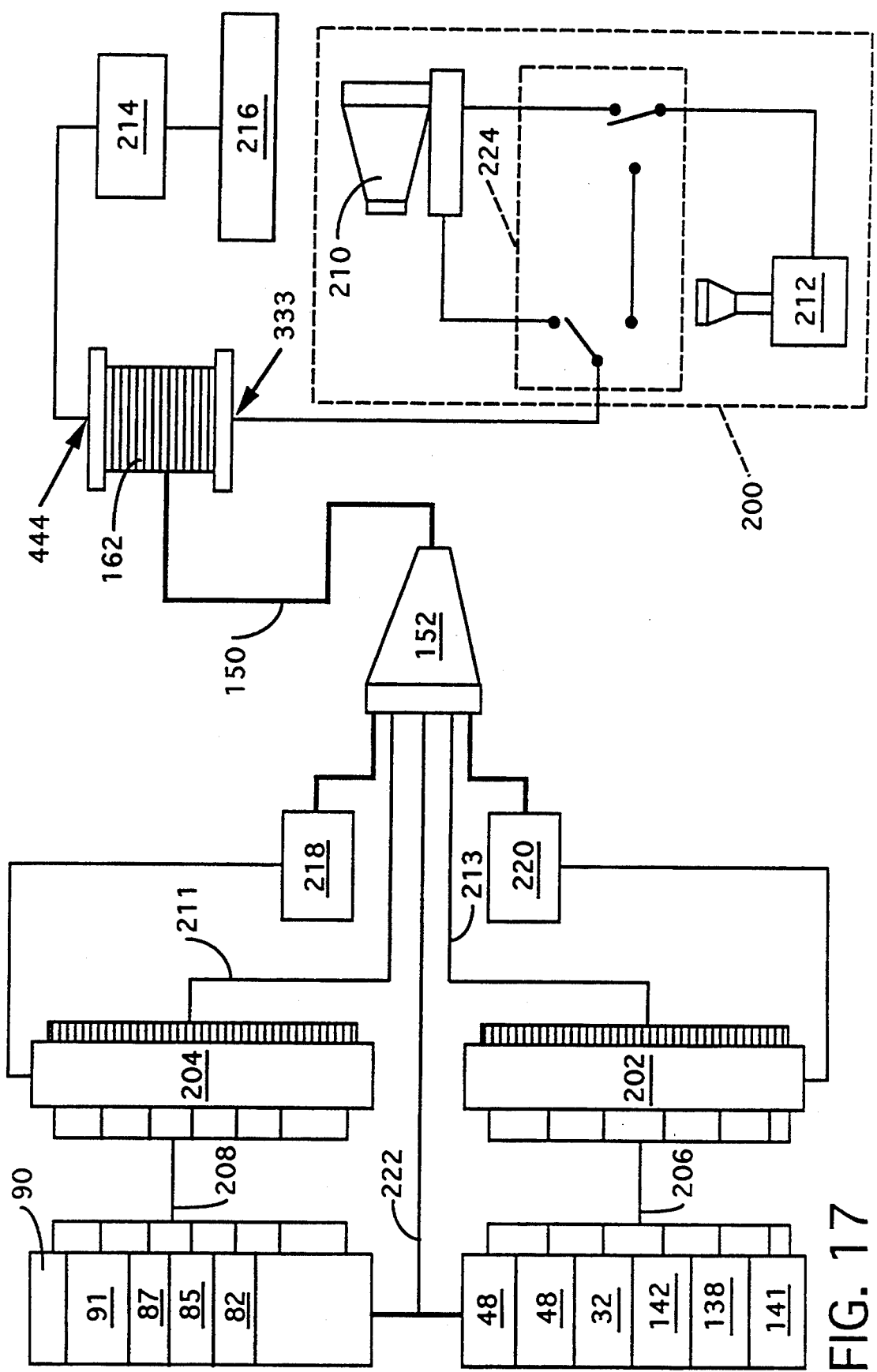
FIG. 17 is a schematic of the hydraulic control system of the present invention.

The hydraulic system diagram shown in FIG. 17 illustrates the schematic layout of the preferred hydraulic control system and shows the separation between the manipulator and frame/plow hydraulic system, whereby two separate sets of servo valves, generally indicated as 202 and 204, are attached to the frame members 14 and control the frame 12 and plow 130, as well as the manipulator 80. More specifically, fluidly connected to the servo valves 202, via hydraulic conduits collectively indicated as 206 in FIG. 17, are the frame front and rear collapse/expand actuators 32, the right and left front and rear track drives 48, the left and right plow blade folding actuators 142, and the plow pitch 138 and yaw actuator 141. Fluidly connected to the servo valves 204, via hydraulic conduits collectively indicated as 208, are the base rotational actuator 82, the boom joint 85, the stick joint 87, the wrist actuators 91, and the gripper 90.

The individual servo valve packages 202 and 204 are directly controlled by hard-wired connections, collectively indicated as 211 and 213, through the tether 150, tether termination 152, and slip-ring 333 and into a computer 210, so that actions from a switch panel (not shown) located in the control console 200 and a joystick 212 can immediately control individual valves in a manner that is known in the art. The hydraulic fluid supply is achieved through a pump 214 and reservoir 216 located outside of the vessel (preferably in the deployment pod 170), fed into the tether drum 162 through a fluid slip ring 444, and then passed into the tether 150, and broken out at the tether termination 152, to supply an accumulator 218 for the manipulator 80 and a manipulator 220 for the frame 12 and the plow 130. The fluid return lines, collectively depicted as 220, from all these systems are then passed back into the tether 150 and back to the reservoir 216 located away from the vehicle 10. In the preferred embodiment, a single dual-switch single-pole-single-throw switch, generally indicated as 224, is provided between the computer 210 and the joystick 212 to allow the joystick 212 to directly control individual actuators without passing through the computer 210, thus increasing system reliability and simplicity. It will be appreciated that the above-described hydraulic control system facilitates the control of the various components of the vehicle 10 in a manner that is known in the art. It will be further appreciated that similar known pneumatic and electrical control systems can be used to control the components of vehicle 10 without departing from the principle and scope of the present invention.

Figure 18:
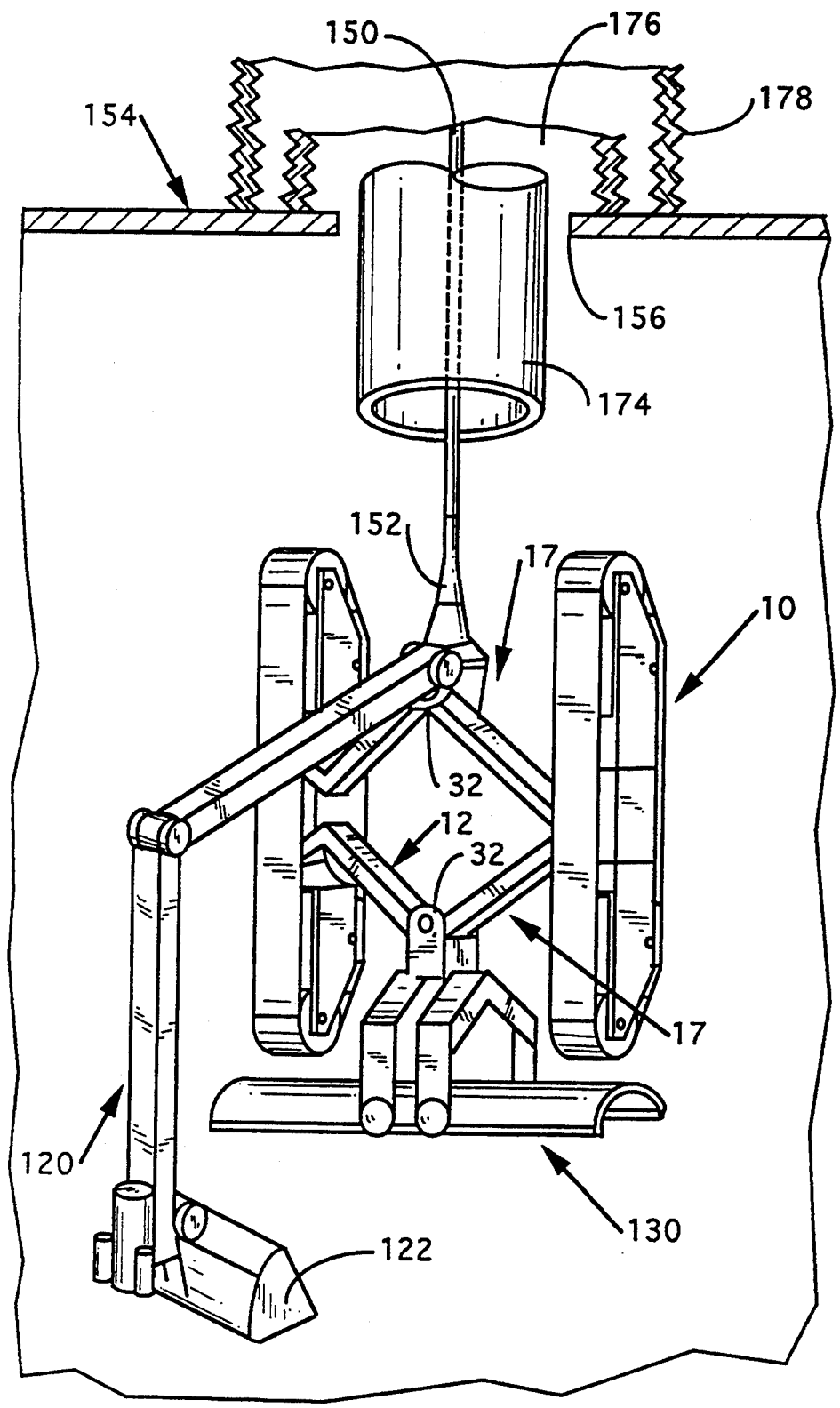
FIG. 18 is a perspective view of the mobile vehicle of the present invention in an expanded position after being deployed through the riser tube insert of the deployment pod of the present invention.
Figure 20:
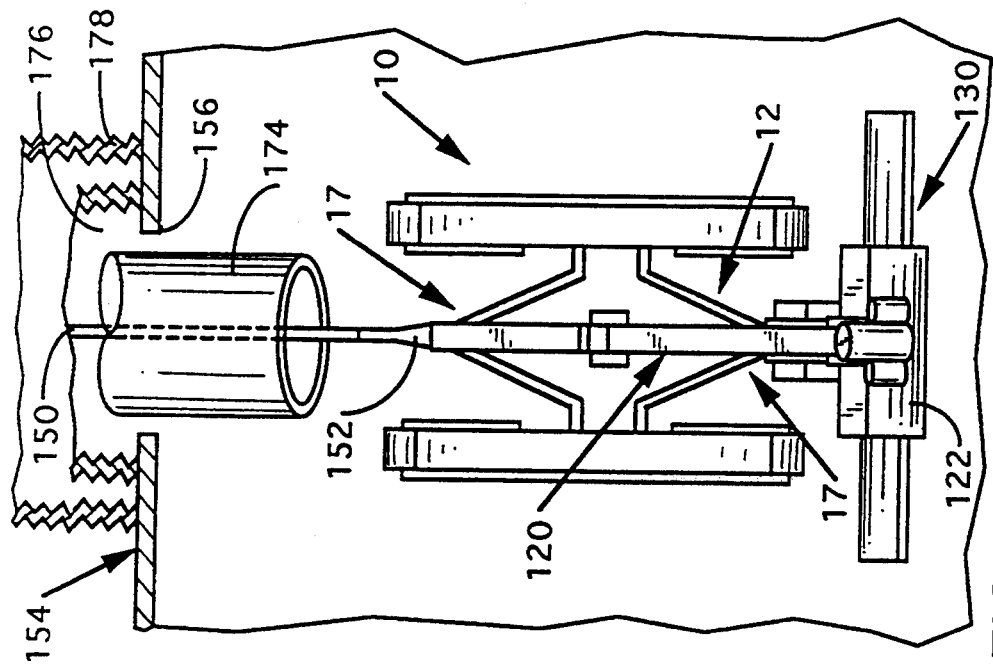
FIG. 20 is a perspective view of the vehicle of FIG. 19 after the boom member thereof has been pivoted to a position wherein it can be retrieved through the present riser tube insert.

FIGS. 16 and 18 illustrate the deployment of the vehicle 10 through the opening 156 in a vessel 154. After the opening 156 has been uncovered, preferably by a manway removal winch 185 attached to the main shell 172, the deployment pod 170 is positioned over the manway 155 preferably by a crane or other suitable apparatus such that the riser tube insert extends into the opening 156 as shown in FIG. 18. It will be understood that the first bellows 176 engages the manway 155 and the second bellows 178 engages the vessel surface to create substantially airtight seals therebetween.

After the deployment pod 170 has been positioned over the manway 155 in the manner described above, the vehicle 10 in its collapsed position is deployed into the tank by operating the tether line management system 160 to thereby pay out the tether line 150 to lower the vehicle 10 into the tank through the riser tube insert 174. After the vehicle 10 has completely passed through the riser tube insert 174 it can be expanded. In the alternative, the vehicle 10 can be expanded after it has contacted the vessel bottom or the material contained therein. As was discussed hereinabove, to expand the frame member 12 of the vehicle 10, the actuators 32 are actuated by means of the joy stick control system described above to thereby cause the frame 12 to assume the expanded configuration. Thereafter, the actuators 142 for the collapsible plow blade 130 may also be actuated to cause the blade members 132 to assume their extended position. Likewise, the manipulator 80 or the backhoe-attachment 120 may be operated to perform the desired tasks within the tank. It will be appreciated that the lights 94 and video camera 92 permit the vehicle's operation to be monitored by those persons operating the vehicle 10 located outside of the vessel 154.

Figure 19:
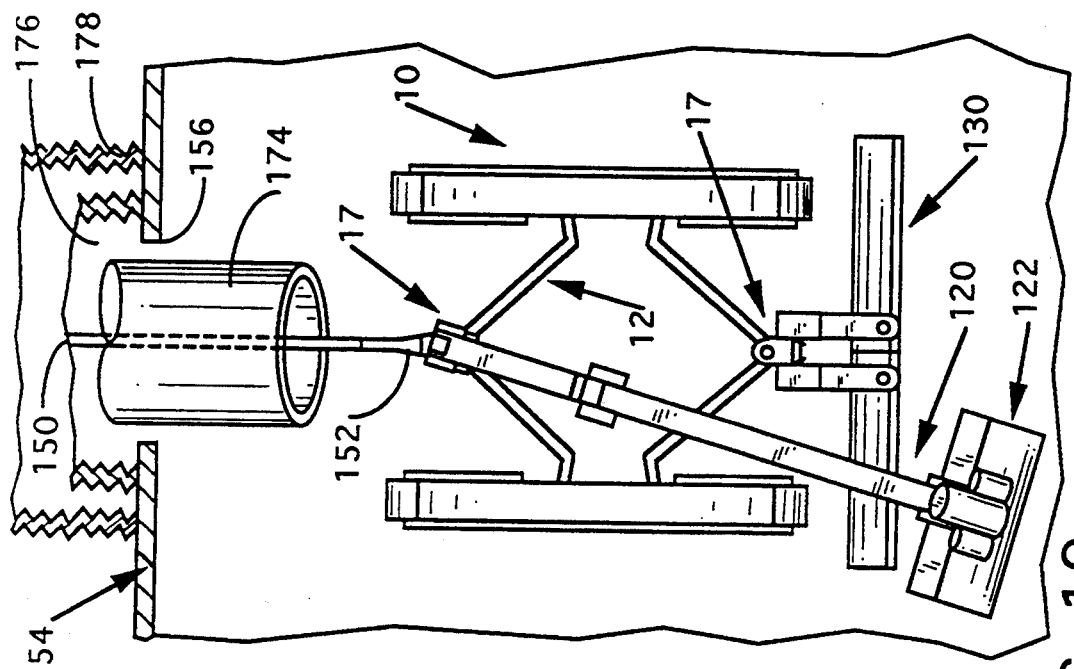
FIG. 19 is a perspective view of the mobile vehicle of the present invention being prepared for retrieval from a vessel.
Figure 22:
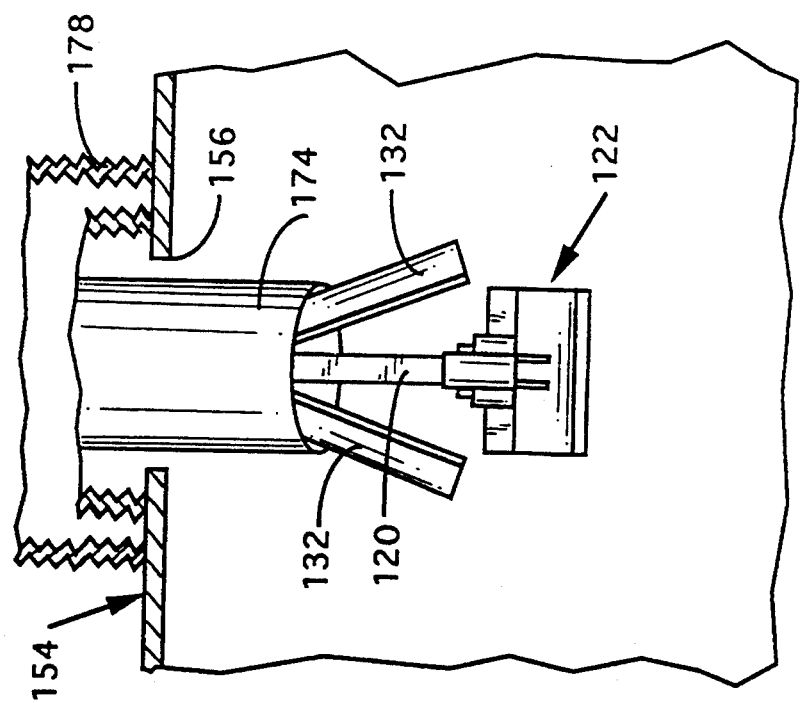
FIG. 22 is a perspective view of the vehicle of FIGS. 19-21 as it progresses further into the present riser tube insert.
Figure 21:
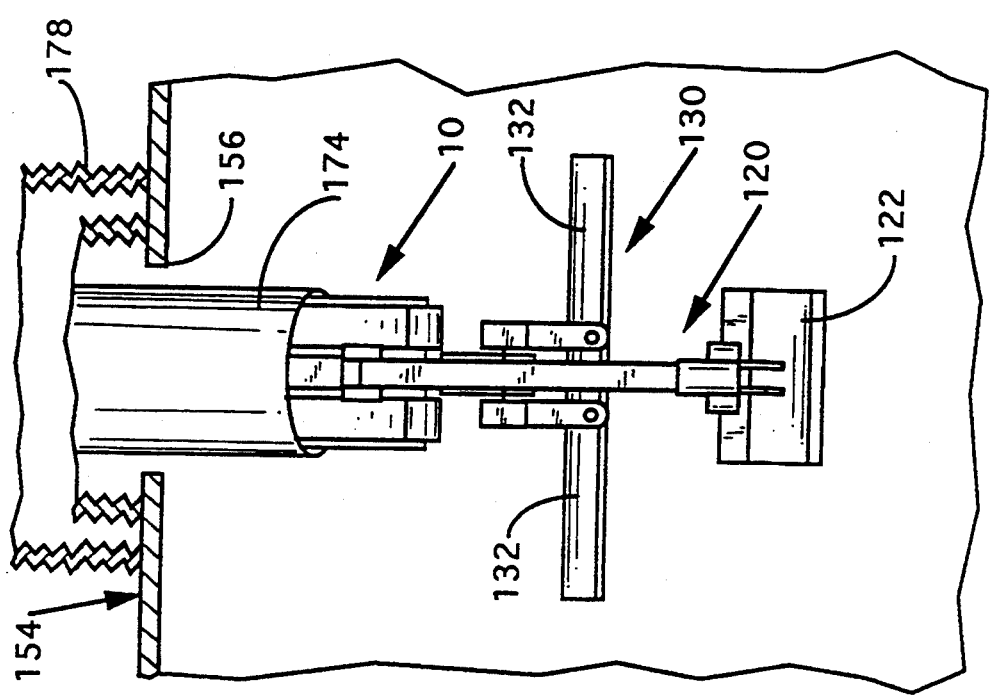
FIG. 21 is a perspective view of the vehicle of FIGS. 19 and 20 as it is retrieved through the present riser tube insert.

FIGS. 19-22 depict the process for retrieving the vehicle 10 from the vessel 154. In particular, to retrieve the vehicle 10 from the vessel 154, the tether management system 160 is actuated to cause the tether line 150 to be wound onto the tether spool 162 thus causing the vehicle 10 to be suspended by the tether line 150 as shown in FIG. 19. Thereafter, actuators 32 are actuated to thereby cause the frame member 12 to assume the semi-collapsed position illustrated in FIG. 20. In addition, the actuators 124 controlling the pivotal motion of the backhoe boom 120 are actuated to straighten and pivot the boom 120 to a position wherein it overlies both joints 17 in the frame member 12. See FIG. 21. Thereafter, the tether line actuator system 160 is activated to cause the vehicle 10 to be drawn into the riser tube insert 174 as shown in FIG. 22. Prior to contacting the riser tube insert 174, the collapsible plow 130 is moved to a collapsed position by actuating actuators 138. See FIG. 22. Thereafter, the tether line management system 160 is further actuated to continue to retrieve the vehicle 10 from the riser tube insert 174 into the main shell 172 of the deployment pod 170. See FIG. 16.

In the preferred embodiment, actuators 32, 84, 126, and 142 are adapted to be freewheeling upon the loss of hydraulic or electrical power thereto. Such arrangement permits the vehicle 10 to be retrieved from the vessel 154 in the event that control power is lost to the vehicle 10. More specifically, by attaching the tether line 150 to the rear joint 17 of the vehicle frame 12 and suspending the vehicle 10 therefrom, the frame member 12 will assume the collapsed position by virtue of its own weight provided that the actuators 32 are not locked in position. As such, by retrieving the tether line 150 by means of the tether line management system or by some other winching means, the vehicle 10 can be retrieved from the vessel 154 during a power outage. As most particularly shown in FIG. 21, even if the plow blade 130 is longer than the diameter of the riser tube insert 174, the blade 130 will be forced into a collapsed configuration by virtue of the blade members 132 hitting the end of the riser tube insert 174 as the vehicle 10 is drawn therein.

As described above, the vehicle 10 of the present invention is particularly well adapted for use in connection with performing a variety of tasks within a storage tank containing hazardous materials. The skilled artisan will readily appreciate, however, that the novel features of the present invention may be incorporated into various other mobile vehicle designs such, for example, construction vehicles that are hauled on vehicles having width restrictions or a demolition/decommissioning vehicle for contaminated nuclear production facilities where maneuverability through tight corridors is necessary. As such, the present invention provides solutions to the aforementioned problems encountered with other known vehicle designs. It will be understood, however, that various changes in the details, materials and arrangements of parts which have been herein described and illustrated in order to explain the nature of the invention may be made by those skilled in the art within the principle and scope of the invention as expressed in the appended claims.

What is claimed is:

1. A mobile vehicle for use in an enclosed vessel having an opening therein comprising:
    a frame member movable between a first collapsed position wherein said frame member can enter the vessel through the opening therein and a second expanded position, said frame member comprising first and second side members and a pair of collapsible frame assemblies, each said collapsible frame assembly comprising two pivotally interconnected linkage members, one linkage member having one end thereof pivotally attached to said first side member and the other of said linkage members having one end thereof pivotally attached to said second side member such that each said collapsible frame assembly extends between said first and second side members;
    drive means attached to said frame member for propelling said frame member;
    rotary actuator means pivotally interconnecting the linkage members of at least one of said collapsible frame assemblies for selectively moving said frame member between said first and second positions; and
    tool means operably attached to said frame member for performing a task in the vessel.

2. The mobile vehicle of claim 1 further comprising control means located outside of said vessel and communicating with said mobile vehicle to enable said mobile vehicle to be controlled by personnel located outside of said vessel.

3. The mobile vehicle of claim 2 further comprising a tether means attached to said frame member, said tether means supplying power to said vehicle from a remote power source and providing a means whereby said vehicle may be deployed and retrieved by a vehicle retrieval means located outside of the vessel.

4. The mobile vehicle of claim 1 wherein said drive means comprises a plurality of surface engaging endless driven members attached to said frame member for driving said frame member on a surface.

5. The mobile vehicle of claim 4 wherein said endless driven members are driven by hydraulic motors.

6. The mobile vehicle of claim 4 wherein said endless driven members are driven by electric motors.

7. The mobile vehicle of claim 4 wherein said endless driven members are driven by pneumatic motors.

8. The mobile vehicle of claim 1 wherein said drive means comprises a plurality of driven elliptically-shaped cylinders each having a helically wound, surface engaging member attached to the outer surface thereof.

9. The mobile vehicle of claim 8 wherein said plurality of elliptically shaped cylinders are hydraulically driven.

10. The mobile vehicle of claim 8 wherein said plurality of elliptically shaped cylinders are electrically driven.

11. The mobile vehicle of claim 10 wherein said plurality of elliptical shaped cylinders are pneumatically driven.

12. The mobile vehicle of claim 1 wherein said drive means comprises a plurality of driven wheels operably attached to said frame member.

13. The mobile vehicle of claim 12 wherein said plurality of driven wheels are hydraulically driven.

14. The mobile vehicle of claim 12 wherein said plurality of driven wheels are electrically driven.

15. The mobile vehicle of claim 12 wherein said plurality of endless driven wheels are pneumatically driven.

16. The mobile vehicle of claim 1 wherein said rotary actuator means comprises:
    a first rotary actuator pivotally interconnecting the linkage members of one said collapsible frame assembly for selectively extending and collapsing said collapsible frame assembly; and
    a second rotary actuator pivotally interconnecting the linkage members of the other said collapsible frame assembly for selectively extending and collapsing the other said collapsible frame assembly.

17. The mobile vehicle of claim 16 wherein said first and second actuators are hydraulically powered rotary actuators.

18. The mobile vehicle of claim 16 wherein said first and second actuators comprise electrically powered rotary actuators.

19. The mobile vehicle of claim 16 wherein said first and second actuators comprise pneumatically powered rotary actuators.

20. The mobile vehicle of claim 1 wherein said tool means is operably attached to said frame member by a pivotable manipulator arm operably attached to said frame member, said pivotable manipulator arm having tool gripping means attached thereto for gripping and manipulating said tool means thereby.

21. The mobile vehicle of claim 20 wherein said tool means is selected from the group containing a hook member, a prybar, and a bucket member.

22. The mobile vehicle of claim 20 further comprising video camera means and light means attached to said pivotable manipulator arm.

23. The mobile vehicle of claim 1 wherein said tool means comprises an articulated backhoe boom operably attached to said frame member, said backhoe boom having a bucket member operably attached thereto.

24. The mobile vehicle of claim 1 wherein said tool means comprises plowing means attached to said frame member.

25. The mobile vehicle of claim 24 wherein said plowing means comprises a collapsible plow member attached to said frame member.

26. The mobile vehicle of claim 25 wherein said collapsible plow member comprises:
a support member pivotally attached to said frame member;
first and second blade members pivotally attached to said support member, said first and second blade members being pivotal between an open position wherein said blade members are aligned to form a continuous plow and a collapsed position wherein said first and second blade members are positioned in a substantially confronting relationship to one another; and
first blade actuator means attached to said support member for selectively pivoting said first and second blade members between said open and collapsed positions.

27. The mobile vehicle of claim 26 wherein said first blade actuator means comprises a first rotary actuator attached to said support member and said first blade member for pivoting said first blade member between said open and collapsed positions and a second rotary actuator attached to said support member and said second blade member for pivoting said second blade member between said open and collapsed positions.

28. The mobile vehicle of claim 26 further comprising second blade actuator means, said second blade actuator means being attached to said support member for selectively raising and lowering said support member with respect to said frame member to simultaneously raise and lower said first and second blade members with respect to said frame member.

29. The mobile vehicle of claim 26 further comprising means for pivoting said collapsible plow member at an angular orientation with respect to said frame member.

30. A collapsible plow attachable to the frame of a mobile vehicle comprising:
a support member pivotally attachable to the frame of the vehicle;
first and second blade members pivotally attached to said support member, said first and second blade members being pivotal between an open position wherein said blade members are aligned to form a continuous plow and a collapsed position wherein said first and second blade members are positioned in a substantially confronting relationship to one another; and
a first rotary actuator attached to said support member and said first blade member for selectively pivoting said first blade member between said open and collapsed positions and a second rotary actuator attached to said support member and said second blade member for pivoting said second blade member between said open and collapsed positions.

31. The collapsible plow of claim 30 further comprising second blade actuator means attached to said support member and the vehicle frame for selectively raising and lowering said support member with respect to the vehicle frame.

32. The collapsible plow of claim 30 further comprising means connected at the pivotal connection of the support member and the frame for moving said collapsible plow to an angular orientation with respect to said frame of said mobile vehicle.

33. The mobile vehicle of claim 1 wherein said tool means comprises camera means operably attached to said frame member.

* * * * *